(12) United States Patent
Han et al.

(10) Patent No.: US 11,454,714 B2
(45) Date of Patent: Sep. 27, 2022

(54) ELECTRONIC DEVICE FOR PERFORMING RANGING BY USING ULTRA-WIDEBAND IN WIRELESS COMMUNICATION SYSTEM, AND METHOD OF OPERATING THE ELECTRONIC DEVICE

(71) Applicant: SAMSUNG ELECTRONICS CO., LTD., Suwon-si (KR)

(72) Inventors: Sehee Han, Suwon-si (KR); Seongah Jeong, Suwon-si (KR); Kangjin Yoon, Suwon-si (KR); Haeyoung Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/926,276

(22) Filed: Jul. 10, 2020

(65) Prior Publication Data
US 2021/0014677 A1  Jan. 14, 2021

(30) Foreign Application Priority Data

Jul. 12, 2019 (KR) .................. 10-2019-0084546
Aug. 5, 2019 (KR) .................. 10-2019-0095182

(51) Int. Cl.
*H04W 4/00* (2018.01)
*G01S 13/02* (2006.01)
(Continued)

(52) U.S. Cl.
CPC ........ *G01S 13/0209* (2013.01); *G01S 5/0284* (2013.01); *G01S 13/765* (2013.01);
(Continued)

(58) Field of Classification Search
CPC ... H04W 12/63; H04W 4/029; H04W 12/104; H04W 12/122; H04W 12/64; H04W 4/70;
(Continued)

(56) References Cited

U.S. PATENT DOCUMENTS 9,210,188 B2    12/2015  Choi et al.
2007/0285306 A1  12/2007  Julian et al.
(Continued)

FOREIGN PATENT DOCUMENTS

EP    3370464 A1   9/2018
EP    3451599 A1   3/2019
WO    2016059451 A1  4/2016

OTHER PUBLICATIONS

International Search Report (PCT/ISA/210) and Written Opinion (PCT/ISA/237) dated Oct. 14, 2020 issued by the International Searching Authority in International Application No. PCT/KR2020/009031.
(Continued)

*Primary Examiner* — Marcos Batista
(74) *Attorney, Agent, or Firm* — Sughrue Mion, PLLC

(57) ABSTRACT

Provided is a secure ranging method capable of blocking access of a malicious user by preventing an attack by the malicious user when ranging is performed using an ultra-wideband (UWB). Also, provided is a method of increasing accuracy of ranging. A method of operating an electronic device for performing ranging by using a UWB in a wireless communication system includes: transmitting and receiving at least one frame for ranging, to and from at least one other electronic device; obtaining a first ranging value and a second ranging value, based on the at least one frame; and performing integrity checking, based on a result of comparing the first ranging value with the second ranging value.

10 Claims, 19 Drawing Sheets

(51) Int. Cl.
*G01S 13/76* (2006.01)
*H04B 1/7163* (2011.01)
*H04W 4/029* (2018.01)
*G01S 5/02* (2010.01)
*H04W 12/104* (2021.01)
*H04W 12/122* (2021.01)
*H04W 12/64* (2021.01)

(52) U.S. Cl.
CPC .......... *H04B 1/7163* (2013.01); *H04W 4/029* (2018.02); *H04W 12/104* (2021.01); *H04W 12/122* (2021.01); *H04W 12/64* (2021.01)

(58) Field of Classification Search
CPC .. G01S 5/0284; G01S 13/0209; G01S 13/765; H04B 1/7163; H04B 2201/71634; H04B 1/719
USPC .......................................... 370/329; 455/312
See application file for complete search history.

(56) References Cited

U.S. PATENT DOCUMENTS

| | | |
|---|---|---|
| 2010/0046586 A1 | 2/2010 | McCorkle |
| 2016/0353238 A1* | 12/2016 | Gherardi ............... H04W 4/021 |
| 2018/0162321 A1 | 6/2018 | Spiess |
| 2018/0295101 A1* | 10/2018 | Gehrmann .......... H04L 63/1458 |
| 2018/0356492 A1 | 12/2018 | Hamilton |
| 2020/0100283 A1* | 3/2020 | Naguib ................... G01S 11/06 |

OTHER PUBLICATIONS

IEEE 80231534 Maintenance SC, et al., "Application of IEEE Std 802.15.4", IEEE P802. 15-14-0223-00-000, May 13, 2014, pp. 1-76 (82 pages).

Communication dated Jun. 20, 2022 by the European Patent Office in European Patent Application No. 20841046.4.

* cited by examiner

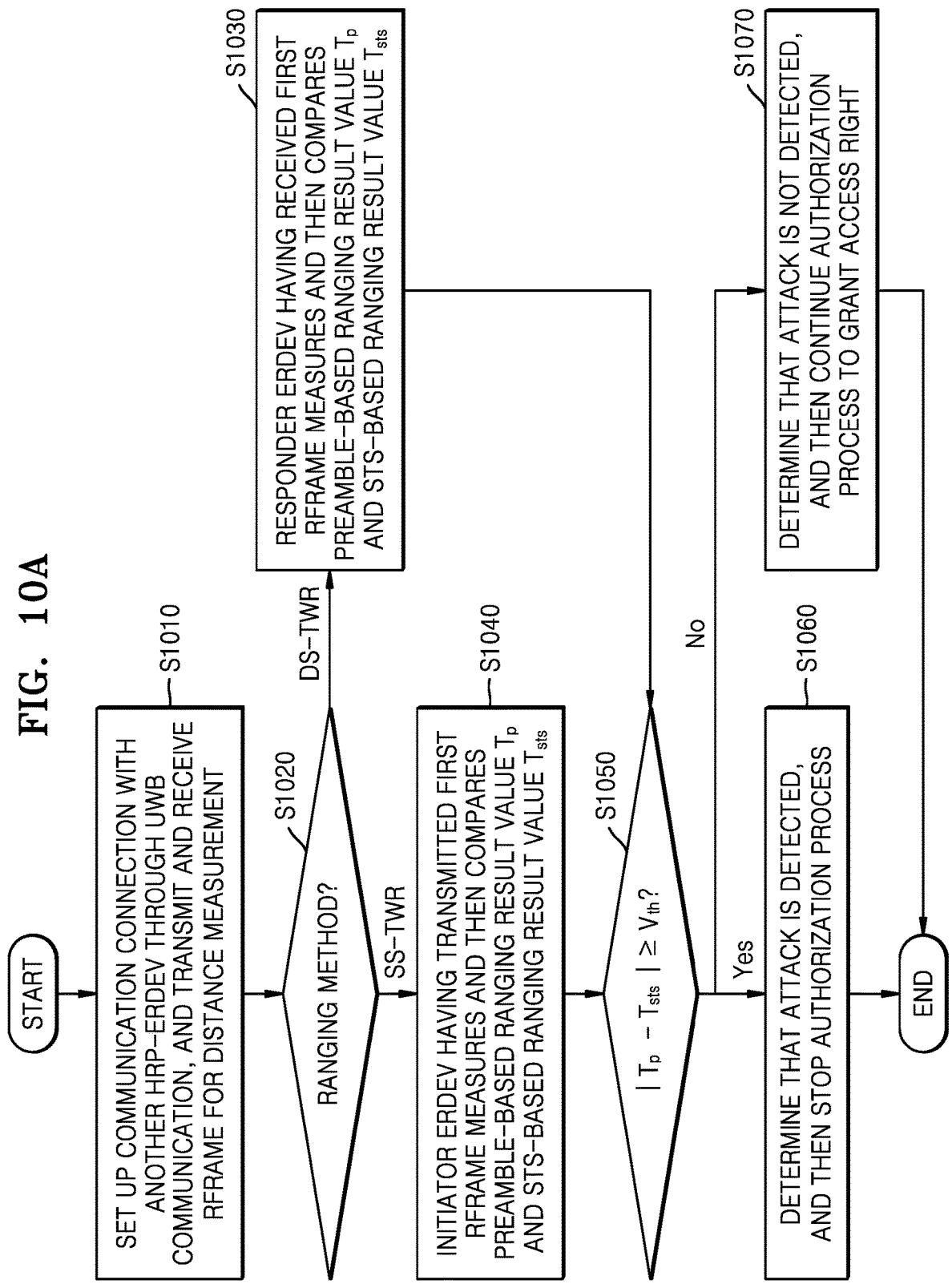

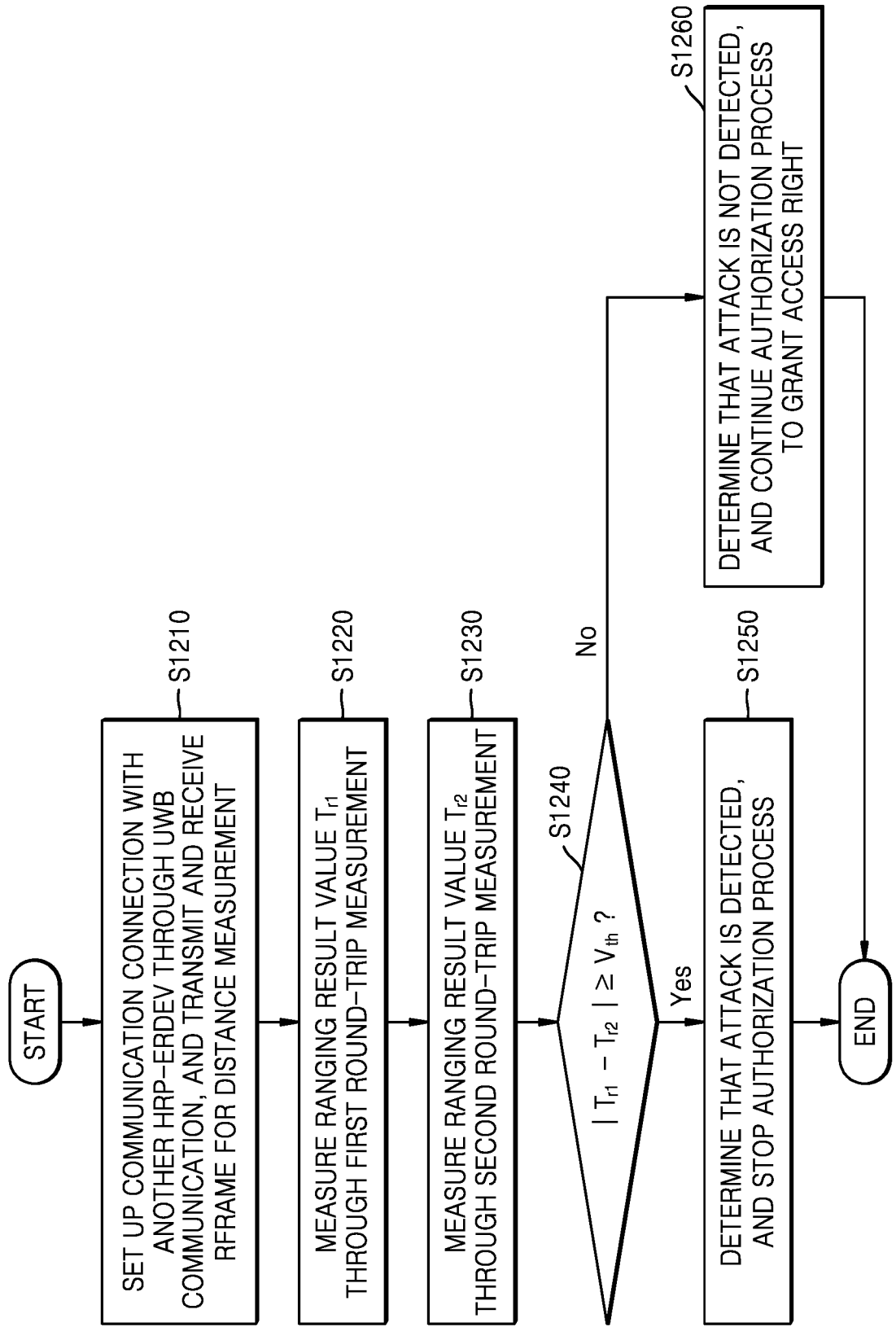

ELECTRONIC DEVICE FOR PERFORMING RANGING BY USING ULTRA-WIDEBAND IN WIRELESS COMMUNICATION SYSTEM, AND METHOD OF OPERATING THE ELECTRONIC DEVICE

CROSS-REFERENCE TO RELATED APPLICATION(S)

This application is based on and claims priority under 35 U.S.C. § 119 to Korean Patent Application No. 10-2019-0084546, filed on Jul. 12, 2019, and Korean Patent Application No. 10-2019-0095182, filed on Aug. 5, 2019, in the Korean Intellectual Property Office, the disclosures of which are incorporated by reference herein in their entireties.

BACKGROUND

1. Field

The disclosure relates to an electronic device for securely and accurately performing ranging by using an ultra-wideband (UWB) in a wireless communication system, and a method of operating the electronic device.

2. Description of Related Art

The Internet has evolved from a human-based connection network, where humans create and consume information, to the Internet of Things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are utilized. In recent years, technologies related to sensor networks for connecting objects, machine-to-machine (M2M) communication, and machine-type communication (MTC) have been studied.

In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Because various services are able to be provided due to the development of wireless communication systems, a method of effectively providing these services is required. For example, in medium access control (MAC), a ranging technology for measuring a distance between electronic devices by using an ultra-wideband (UWB) may be used. The UWB refers to a wireless communication technology using a very wide frequency band of several GHz or more in a baseband, without using radio carriers.

SUMMARY

Provided are a secure ranging method and electronic apparatus capable of blocking access of a malicious user by preventing an attack by the malicious user when ranging is performed using an ultra-wideband (UWB). Also provided are a method and apparatus for increasing accuracy of ranging.

Additional aspects will be set forth in part in the description which follows and, in part, will be apparent from the description, or may be learned by practice of the presented embodiments.

In accordance with an aspect of the disclosure, a method of operating an electronic device for performing ranging by using an ultra-wideband (UWB) in a wireless communication system includes: transmitting and receiving at least one frame for ranging, to and from at least one other electronic device; obtaining a first ranging value and a second ranging value, based on the at least one frame; and performing integrity checking, based on a result of comparing the first ranging value with the second ranging value.

In accordance with another aspect of the disclosure, an electronic device for performing ranging by using an ultra-wideband (UWB) in a wireless communication system includes: a communicator configured to transmit and receive at least one frame for ranging, to and from at least one other electronic device; and at least one processor configured to obtain a first ranging value and a second ranging value, based on the at least one frame, and perform integrity checking, based on a result of comparing the first ranging value with the second ranging value.

In accordance with another aspect of the disclosure, a non-transitory computer-readable recording medium has recorded thereon a program for executing a method of operating an electronic device for performing ranging by using an ultra-wideband (UWB) in a wireless communication system, the method including: transmitting and receiving at least one frame for ranging, to and from at least one other electronic device; obtaining a first ranging value and a second ranging value, based on the at least one frame; and performing integrity checking, based on a result of comparing the first ranging value with the second ranging value.

In accordance with another aspect of the disclosure, a method of operating an electronic device for performing ranging by using an ultra-wideband (UWB) in a wireless communication system includes: transmitting and receiving at least one frame for ranging, to and from at least one other electronic device; obtaining a first ranging value and a second ranging value, based on the at least one frame; and determining a third ranging value, based on the first ranging value and the second ranging value.

In accordance with another aspect of the disclosure, an electronic device for performing ranging by using an ultra-wideband (UWB) in a wireless communication system includes: a communicator configured to transmit and receive at least one frame for ranging, to and from at least one other electronic device; and at least one processor configured to obtain a first ranging value and a second ranging value, based on the at least one frame, and determine a third ranging value, based on the first ranging value and the second ranging value.

In accordance with another aspect of the disclosure, a non-transitory computer-readable recording medium has recorded thereon a program for executing a method of operating an electronic device for performing ranging by using an ultra-wideband (UWB) in a wireless communication system, the method including: transmitting and receiving at least one frame for ranging, to and from at least one other electronic device; obtaining a first ranging value and a second ranging value, based on the at least one frame; and determining a third ranging value, based on the first ranging value and the second ranging value.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10A is a flowchart of a method by which an electronic device performs ranging and integrity checking by using an STS and a preamble, according to an embodiment;

FIG. 12 is a flowchart of a method by which an electronic device performs ranging and integrity checking by using DS-TWR, according to an embodiment;

DETAILED DESCRIPTION

Figure 1:
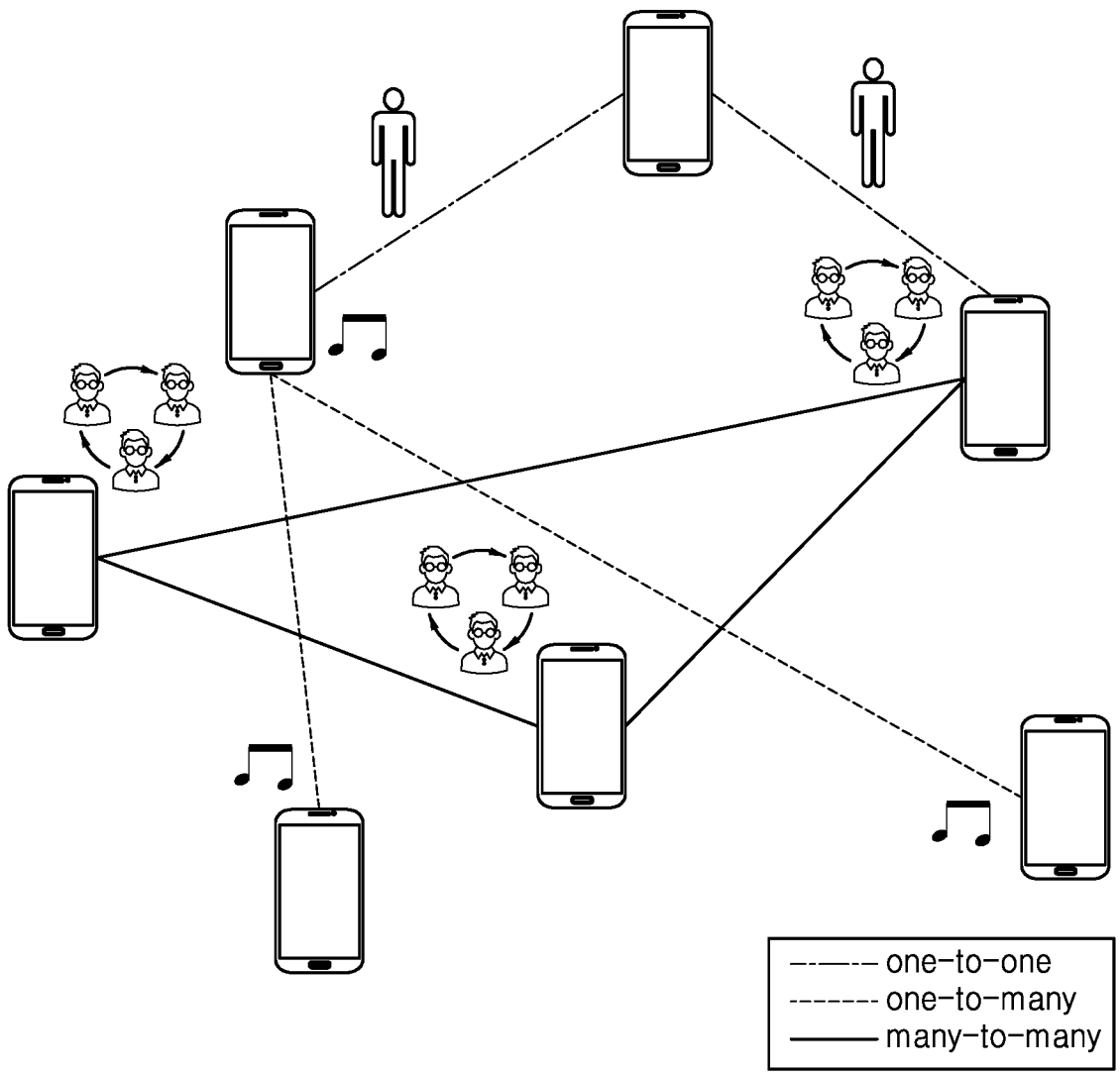
FIG. 1 is a diagram for describing a general device-to-device (D2D) communication procedure.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, like reference numerals denote like elements.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. Therefore, it is noted that the terms used herein are construed based on practical meanings thereof and the whole content of this specification, rather than being simply construed based on names of the terms.

Throughout the disclosure, expressions such as "at least one of a, b or c" (or "at least one of a, b, and c") indicates only a, only b, only c, both a and b, both a and c, both b and c, or all of a, b, and c.

Examples of a terminal may include a user equipment (UE), a mobile station (MS), a cellular phone, a smartphone, a computer, a multimedia system capable of performing a communication function, or the like.

In the disclosure, a controller may also be referred to as a processor (or at least one processor).

In the disclosure, a layer (or a layer apparatus) may also be referred to as an entity.

Terms such as "first" and "second" may be used to designate various elements, but the elements should not be limited by these terms. These terms are merely used to distinguish one element from another.

Terms in the following description are merely used to describe specific embodiments of the disclosure, and are not intended to limit the scope of the disclosure. The singular forms "a," "an," and "the" are intended to include the plural forms as well, unless the context clearly indicates otherwise. Throughout the specification, when an element is referred to as being "connected to" another element, the element can be "directly connected to" the other element or be "electrically connected to" the other element via an intervening element. The terms "comprises," "comprising," "includes" and/or "including," when used herein, specify the presence of stated elements, but do not preclude the presence or addition of one or more other elements.

The definite article "the" or other demonstratives may indicate both a singular form and a plural form. Unless the context clearly indicates otherwise, operations included in a method according to an embodiment may be performed in an appropriate order. The order of describing the operations does not limit the scope of the disclosure.

The phrase "an embodiment" or "an embodiment of the disclosure" at various parts of this specification does not always designate the same embodiment of the disclosure.

An embodiment of the disclosure may be represented as functional blocks and various processing steps. Some or all of the functional blocks may be implemented by various numbers of hardware and/or software elements configured to perform certain functions. For example, the functional blocks of the disclosure may be implemented by one or more microprocessors or circuit elements for certain functions. As another example, the functional blocks of the disclosure may be implemented using various programming or scripting languages. The functional blocks may be implemented using algorithms executed by one or more processors. Furthermore, the disclosure may employ known technologies for electronic settings, signal processing, and/or data processing.

In addition, connection lines or connection members between elements illustrated in the drawings merely indicate functional connections and/or physical or circuit connections. Connections between elements may be represented by various replaceable or additional functional connections, physical connections, or circuit connections in an actual apparatus.

In general, wireless sensor network technology is mainly divided into wireless local area network (WLAN) technology and wireless personal area network (WPAN) technology depending on sensing area coverage. In this case, the WLAN technology is based on IEEE 802.11 and enables access to a backbone network within a radius of about 100 m. Meanwhile, the WPAN technology is based on IEEE 802.15 and includes Bluetooth, ZigBee, ultra-wideband communication (UWB), etc. A wireless sensor network implemented using the wireless sensor network technology may include a plurality of communicable electronic devices. In this case, the plurality of communicable electronic devices perform communication in an ACTIVE period by using a single channel. That is, the communicable electronic devices may collect packets and transmit the collected packets in the ACTIVE period.

UWB may refer to a short-range high-speed wireless communication technology using a wide frequency band of several GHz or more, a low spectrum density, and a short pulse width (e.g., 1 to 4 nsec) in a baseband. UWB may also refer to a band using UWB communication. Although a communication method of electronic devices is described below based on UWB, UWB is merely an example and various wireless communication technologies may also be used.

Electronic devices according to embodiments of the disclosure may include mobile phones, smartphones, mobile devices, laptop computers, digital broadcast receivers, personal digital assistants (PDAs), portable multimedia players (PMP), navigation systems, slate PCs, tablet PCs, digital TVs, desktop computers, refrigerators, projectors, vehicles, smart cars, printers, etc.

Reference will now be made in detail to embodiments of the disclosure, examples of which are illustrated in the accompanying drawings.

FIG. 1 is a diagram for describing a general device-to-device (D2D) communication procedure.

D2D communication refers to a direct communication scheme between geographically adjacent electronic devices without using an infrastructure such as a base station. As illustrated in FIG. 1, the electronic devices may communicate 1:1, 1:many, or many:many. D2D communication may use an unlicensed frequency band as in Wi-Fi direct or Bluetooth communication. Alternatively, D2D communication may improve the frequency utilization efficiency of a cellular system by using a licensed frequency band.

Although D2D communication may be restrictively used as a term indicating machine-to-machine (M2M) communication, D2D communication in the disclosure may include communication not only between simple electronic devices having a communication function, but also between various types of electronic devices having a communication function, e.g., smartphones or personal computers.

Figure 2:
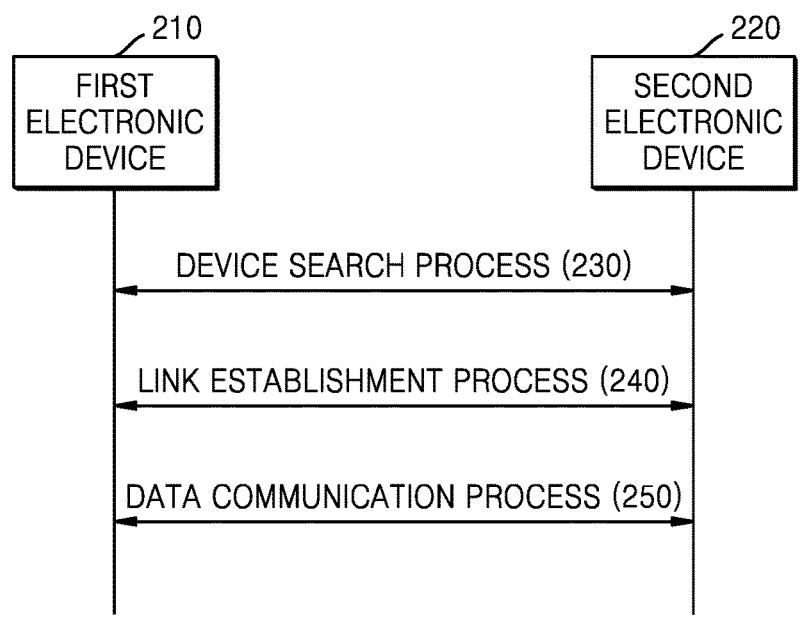
FIG. 2 is a diagram illustrating a communication process between a plurality of electronic devices.

FIG. 2 is a diagram illustrating a communication process between a plurality of electronic devices 210 and 220.

A first electronic device 210 and a second electronic device 220 may communicate with each other through a device search process 230, a link establishment process 240, and a data communication process 250.

In the device search process 230, each of the first electronic device 210 and the second electronic device 220 may search among peripheral electronic devices to find other electronic devices capable of D2D communication. As such, each of the first electronic device 210 and the second electronic device 220 may determine whether to establish links for D2D communication. For example, the first electronic device 210 may transmit a search signal such that the second electronic device 220 may find the first electronic device 210. The first electronic device 210 may determine that other electronic devices capable of D2D communication are within a D2D communication range, by receiving a search signal transmitted by the second electronic device 220.

In the link establishment process 240, each of the first electronic device 210 and the second electronic device 220 may establish links for data transmission with desired electronic devices from among the electronic devices found in the device search process 230. For example, the first electronic device 210 may establish a link for data transmission with the second electronic device 220 found in the device search process 230.

In the data communication process 250, each of the first electronic device 210 and the second electronic device 220 may transmit and receive data to and from the devices with which the links are established in the link establishment process 240. For example, the first electronic device 210 may transmit and receive data to and from the second electronic device 220 through the link established in the link establishment process 240. Hereinafter, the first electronic device 210 may be referred to as an initiator, and the second electronic device 220 may be referred to as a responder.

Figure 3:
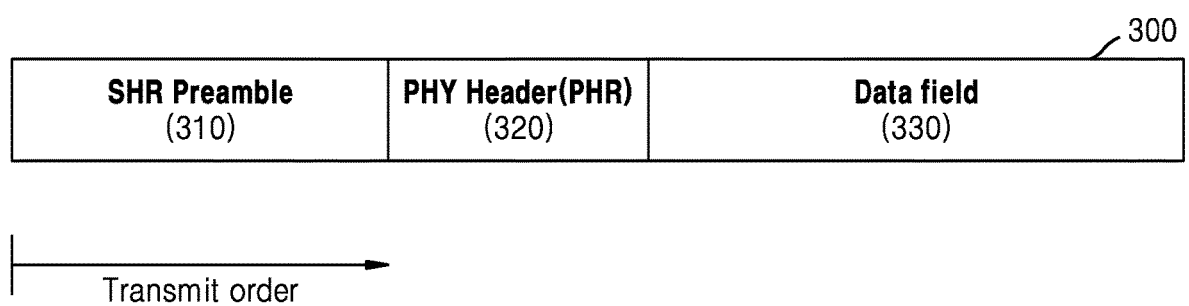
FIG. 3 is a diagram illustrating an ultra-wideband (UWB) physical layer (PHY) frame structure.

FIG. 3 is a diagram illustrating an ultra-wideband (UWB) physical layer (PHY) frame structure.

A UWB PHY frame 300 may include a synchronization header (SHR) preamble 310, a PHY header (PHR) 320, and a data field 330.

The SHR preamble 310 may be used for at least one of automatic gain control (AGC), signal acquisition, frequency offset estimation, packet synchronization, channel estimation, etc., and more particularly, for ranging. Specifically, the SHR preamble 310 may be added, before the PHR 320, for a receiver algorithm related to leading-edge signal tracking for AGC setting, antenna diversity selection, timing acquisition, frequency recovery, packet and frame synchronization, channel estimation, and ranging. The SHR preamble 310 may be referred to as preamble code.

The PHR 320 may include information about the content of a PHY protocol data unit (PPDU) and a protocol used to transmit the PPDU.

The data field 330 may include data to be transmitted or received.

In UWB communication, an SHR preamble may be transmitted at a front part of a frame to obtain synchronization between a transmitter and a receiver. The SHR preamble may be a signal agreed to between the transmitter and the receiver. In a wireless communication system, an SHR preamble may be determined in such a manner that a transmitter may be rapidly synchronized with a receiver at a starting point of a frame. The UWB PHY frame structure according to an embodiment is illustrated in FIG. 3, and the UWB PHY frame structure according to various other embodiments is not limited to the illustration of FIG. 3.

Various embodiments of the disclosure relate to medium access control (MAC), and a distance between electronic devices to be measured for MAC in the UWB. In this case, ranging technology may be used to measure the distance between electronic devices.

Compared to a technology of measuring a distance based on Wi-Fi, Bluetooth, Bluetooth low energy (BLE), and ultrasonic waves, ranging technology using a UWB may use a wide band and thus provide high accuracy. For example, the ranging technology using a UWB may provide an error accuracy of about ±10 cm. On the other hand, the distance measurement technology using Wi-Fi may provide an error accuracy of about ±1 m.

For example, in a door opening/closing scenario using UWB ranging, when a user approaches a door to enter or exit, a distance between a mobile device and an electronic device included in the door may be measured without intervention of the user. In this case, when (or based on) the measured distance between the electronic devices satisfies a threshold value, a door lock may be locked or unlocked.

Meanwhile, IEEE 802.15.4z is a PHY/MAC specification supporting UWB enhanced ranging enhanced in terms of security compared to the legacy specification (IEEE 802.15.4). A high rate pulse repetition frequency (HRP) UWB PHY of IEEE 802.15.4z indicates a method capable of solving vulnerability of the legacy specification to a relay attack or a mafia attack/brute force attack during preamble-based first path detection. To achieve security against vulnerable attacks, the HRP UWB PHY considers an increase in integrity and accuracy of ranging measurement timestamps using a ciphered sequence or a scrambled timestamp sequence (STS) that only two ranging devices know. Hereinafter, a UWB ranging device supporting an HRP UWB PHY mode is called an HRP-enhanced ranging device (ERDEV).

Figure 4:
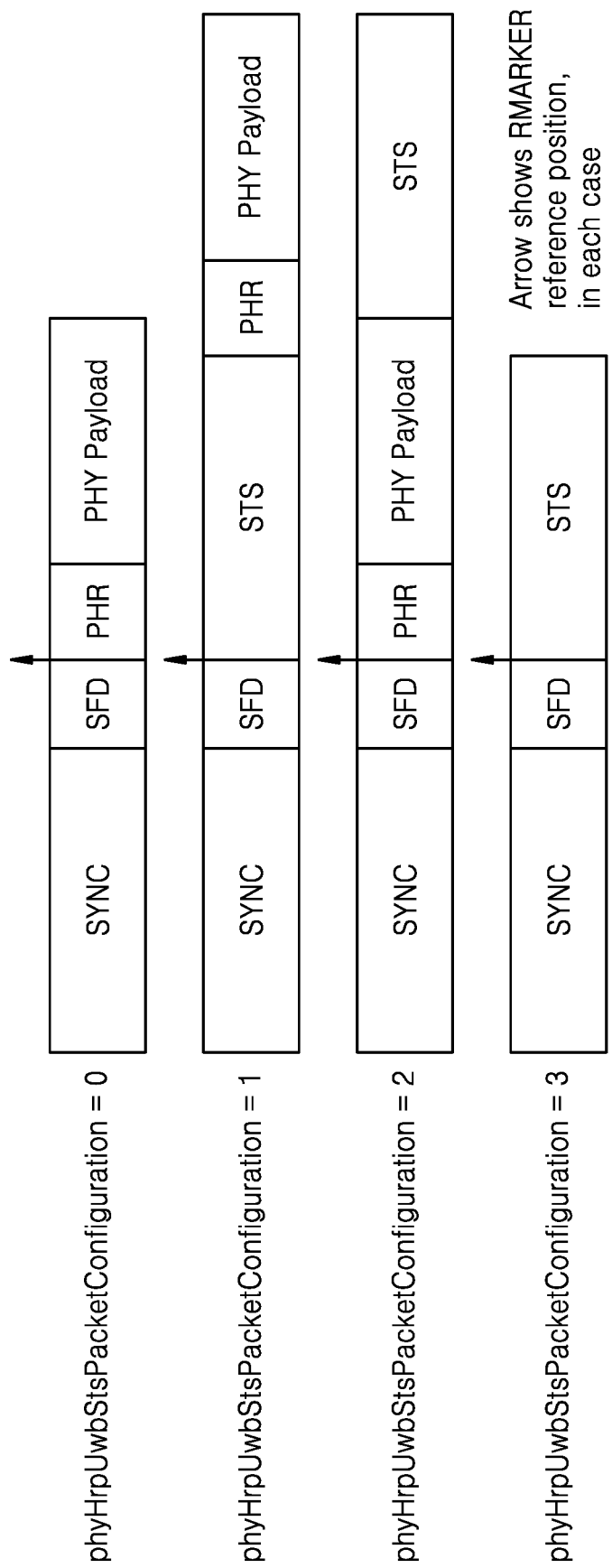
FIG. 4 is a diagram illustrating the structure of a physical layer protocol data unit (PPDU) of a high rate pulse repetition frequency-enhanced ranging device (HRP-ERDEV)

FIG. 4 is a diagram illustrating the structure of a PPDU of an HRP-ERDEV.

FIG. 4 illustrates PPDU formats of an HRP-ERDEV with a ranging marker (RMARKER). The RMARKER may refer to information in a frame for defining a reference timing. The RMARKER is indicated by an arrow in FIG. 4. The HRP-ERDEV is a device capable of transmitting and receiving a packet including an STS, and may detect a first path for ranging by using the STS. A ranging frame (RFRAME) with a ranging field bit set in a PHR may be generally used for a ranging operation of the HRP-ERDEV. As illustrated in FIG. 4, a timing for ranging may be measured on the basis of the RMARKER indicating a peak position of a UWB pulse of a first chip/symbol after a start-of-frame (SoF) delimiter (SFD). To measure a time of arrival, the HRP-ERDEV may measure the RMARKER timing by using the STS.

Figure 5:
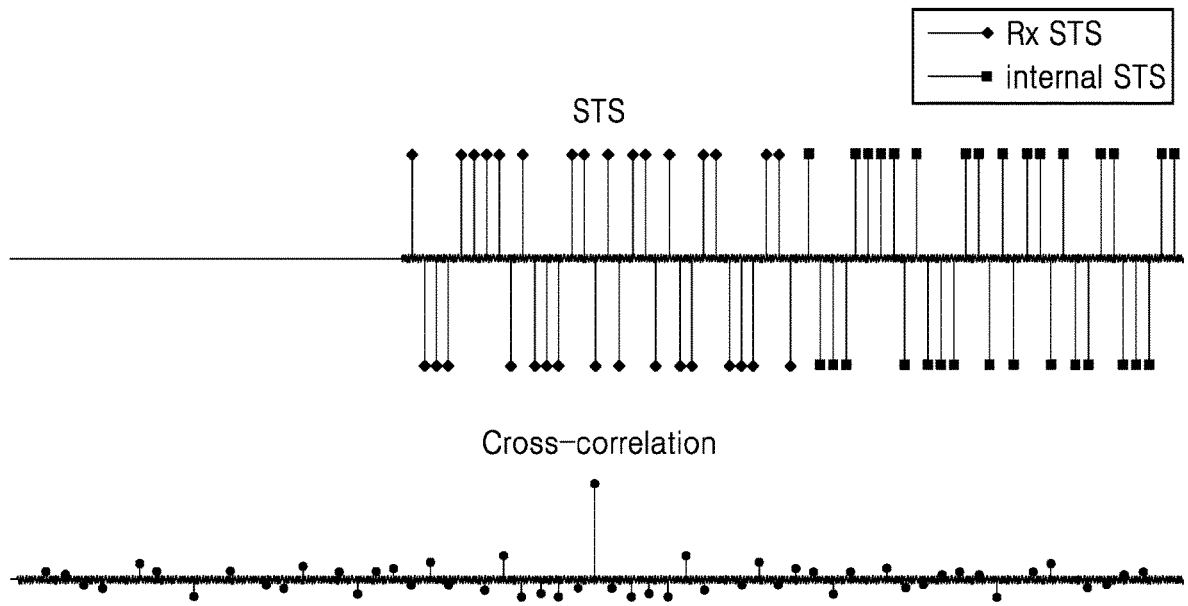
FIG. 5 is a diagram for describing a method of determining a reception timing of a frame by using a scrambled timestamp sequence (STS)

FIG. 5 is a diagram for describing a process by which an HRP-ERDEV performs first path detection through correlation analysis using an STS, according to an embodiment. The STS is a cipher sequence that only two electronic devices participating in ranging know. Each of the two electronic devices may calculate the STS by using a deterministic random bit generator (DRBG). When an ERDEV serving as a transmitter transmits an RFRAME including the STS, an ERDEV serving as a receiver may verify whether the received STS has the same value as the directly calculated STS. When it is verified that the received STS has the same value as the directly calculated STS, the ERDEV serving as the receiver may trust received information and use the same for ranging. The ERDEV serving as the receiver may detect a first path by finding a reception timing of the STS on the basis of a peak value of cross correlation of the received STS and the directly calculated STS. Based on a timing measured on the basis of this first path, a distance between the two ERDEVs may be measured through single-sided two-way ranging (SS-TWR) and/or double-sided two-way ranging (DS-TWR).

Figure 6:
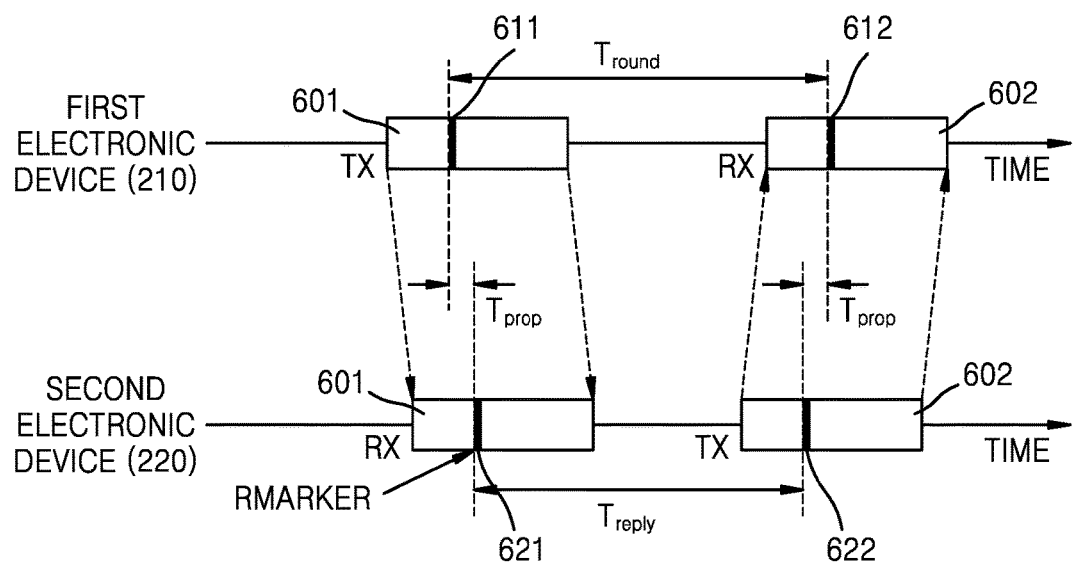
FIG. 6 is a diagram for briefly describing a single-sided two-way ranging (SS-TWR) operation of electronic devices.

FIG. 6 is a diagram for briefly describing an SS-TWR operation of electronic devices. In FIG. 6, a first electronic device 210 may be referred to as an initiator device, and a second electronic device 220 may be referred to as a responder device.

Referring to FIG. 6, when the first electronic device 210 transmits a first RFRAME 601 to the second electronic device 220, the second electronic device 220 may measure a reception timing of the first RFRAME 601 through STS-based first path detection. The second electronic device 220 may transmit a second RFRAME 602 to the first electronic device 210 and measure a ranging reply time $T_{reply}$. The first electronic device 210 having received the second RFRAME 602 may measure a reception timing of the second RFRAME 602 through STS-based first path detection and measure a ranging round time $T_{round}$.

Specifically, the first electronic device 210 may measure, as $T_{round}$, a time between a first-1 RMARKER 611 included in the first RFRAME 601 transmitted to the second electronic device 220 and a first-2 RMARKER 612 included in the second RFRAME 602 received from the second electronic device 220. The second electronic device 220 may measure, as $T_{reply}$, a time between a second-1 RMARKER 621 included in the first RFRAME 601 received from the first electronic device 210 and a second-2 RMARKER 622 included in the second RFRAME 602 transmitted to the first electronic device 210.

The second electronic device 220 may transmit the value $T_{reply}$ to the first electronic device 210 by using a data frame such that the first electronic device 210 may calculate a time of flight (ToF) $T_{prop}$ according to [Equation 1] below. The first electronic device 210 may estimate a distance (i.e., perform ranging) between the first electronic device 210 and the second electronic device 220 by multiplying $T_{prop}$ by the speed of light (e.g., $3 \times 10^8$ m/s).

$$\hat{T}_{prop} = \frac{1}{2}(T_{round} - T_{reply})$$ [Equation 1]

Figure 7:
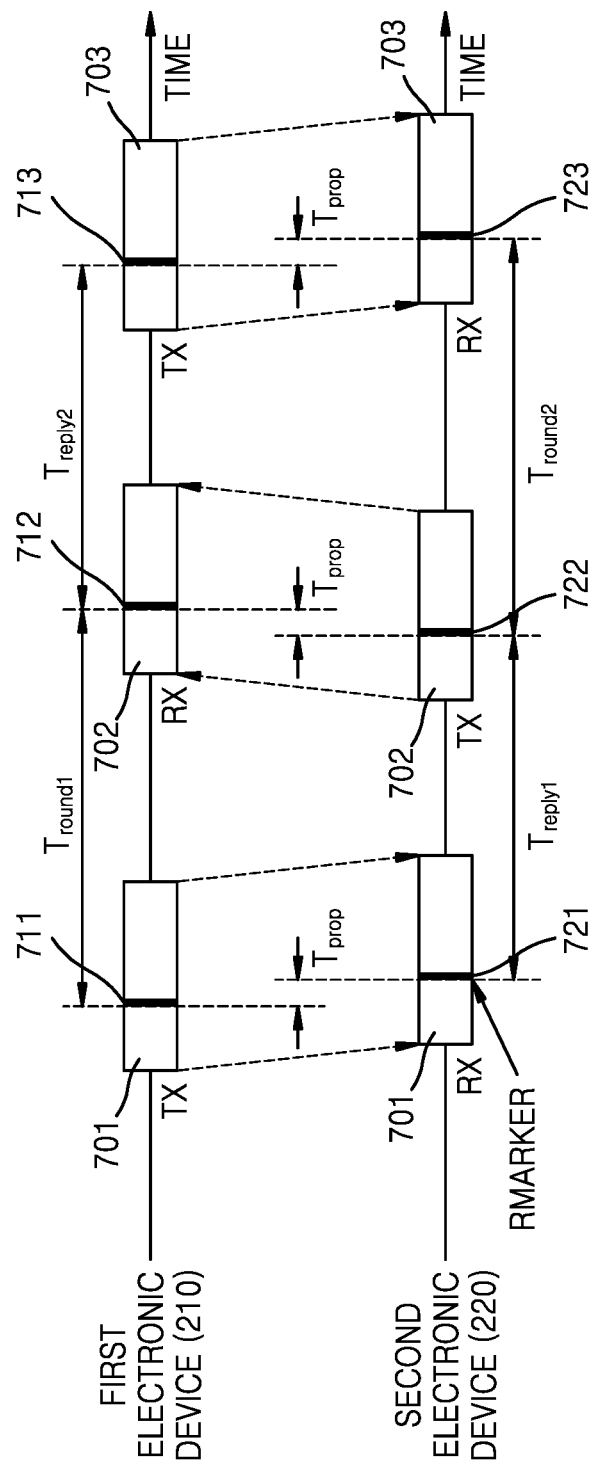
FIG. 7 is a diagram for briefly describing a double-sided two-way ranging (DS-TWR) operation of electronic devices.

FIG. 7 is a diagram for briefly describing a DS-TWR operation of electronic devices. In FIG. 7, a first electronic device 210 may be referred to as an initiator device, and a second electronic device 220 may be referred to as a responder device.

Similar to SS-TWR described above, DS-TWR may be performed by transmitting an RFRAME three times.

Referring to FIG. 7, when (or based on) the first electronic device 210 transmits a first RFRAME 701 to the second electronic device 220, the second electronic device 220 may measure a reception timing of the first RFRAME 701 through STS-based first path detection. The second electronic device 220 may transmit a second RFRAME 702 to the first electronic device 210. The second electronic device 220 may measure a ranging reply time $T_{reply1}$. The first electronic device 210 having received the second RFRAME 702 may measure a reception timing of the second RFRAME 702 through STS-based first path detection and measure a ranging round time $T_{round1}$.

When the first electronic device 210 having received the second RFRAME 702 transmits a third RFRAME 703 to the second electronic device 220, the second electronic device 220 may measure a reception timing of the third RFRAME 703 through STS-based first path detection. The first electronic device 210 may measure a ranging reply time $T_{reply2}$. The second electronic device 220 having received the third RFRAME 703 may measure a reception timing of the third RFRAME 703 through STS-based first path detection and measure a ranging round time $T_{round2}$.

Specifically, the first electronic device 210 may measure, as $T_{round1}$, a time between a first-1 RMARKER 711 included in the first RFRAME 701 transmitted to the second electronic device 220 and a first-2 RMARKER 712 included in the second RFRAME 702 received from the second electronic device 220. The second electronic device 220 may measure, as $T_{reply1}$, a time between a second-1 RMARKER 721 included in the first RFRAME 701 received from the first electronic device 210 and a second-2 RMARKER 722 included in the second RFRAME 702 transmitted to the first electronic device 210.

The second electronic device 220 may measure, as $T_{round2}$, a time between the second-2 RMARKER 722 included in the second RFRAME 702 transmitted to the first electronic device 210 and a second-3 RMARKER 723 included in the third RFRAME 703 received from the first electronic device 210. The first electronic device 210 may measure, as $T_{reply2}$, a time between the first-2 RMARKER 712 included in the second RFRAME 702 received from the second electronic device 220 and a first-3 RMARKER 713 included in the third RFRAME 703 transmitted to the second electronic device 220.

The second electronic device 220 may receive $T_{round1}$ and $T_{reply2}$ from the first electronic device 210 by using a data frame. The second electronic device 220 may calculate $T_{prop}$ according to [Equation 2] below and measure a distance between the first electronic device 210 and the second electronic device 220 by multiplying $T_{prop}$ by the speed of light (e.g., $3 \times 10^6$ m/s).

$$\hat{T}_{prop} = \frac{(T_{round1} \times T_{round2} - T_{reply1} \times T_{reply2})}{(T_{round1} + T_{round2} + T_{reply1} + T_{reply2})} \quad \text{[Equation 2]}$$

Meanwhile, a ranging parameter is determined by an ERDEV called a controller and is notified to an ERDEV called a controllee. Although the controllee may request the controller to change the ranging parameter by using a ranging change request information element (IE) during a ranging measurement period, eventually, the controller determines whether to accept the requirement of the controllee. The ranging parameter may include a parameter related to at least one of a ranging scheme indicating whether to use SS-TWR or DS-TWR, a ranging cycle, the number of frames used for ranging, or the number of STS segments included in a frame. In FIGS. 6 and 7, one of the first and second electronic devices 210 and 220 may serve as a controller, and the other may serve as a controllee.

As described above, secure ranging may be performed based on first path detection using an STS. However, a risk of a security attack by an attacker using an early path insertion strategy still exists.

According to the early path insertion strategy, a probability of success of the attack is increased when a signal-to-noise ratio (SNR) of a signal transmitted by the attacker is higher than the SNR of a signal transmitted by a device participating in ranging. For example, when the attacker is located closer to or transmits a signal at higher power to a receiving device, the probability of success of the security attack may be increased.

The attacker may know a PPDU format and a preamble structure of an HRP UWB PHY through the released IEEE 802.15.4z standard. The attacker may know an STS transmission timing by performing synchronization based on a preamble. The attacker may make an early peak occur when an ERDEV serving as a receiver performs first path detection, by using random noise during an STS transmission period.

Therefore, the ERDEV serving as the receiver may estimate a distance shorter than an actual distance as a result of ranging, due to jamming of the attacker. Thus, in a use case where authentication is guaranteed based on a ranging result value, for example, in a scenario for determining whether a user with a digital key approaches a vehicle or a scenario for determining any other physical approach, a security hole vulnerable to a relay attack or a mafia attack may be caused.

A relay attack will now be described with reference to FIG. 8.

Figure 8:
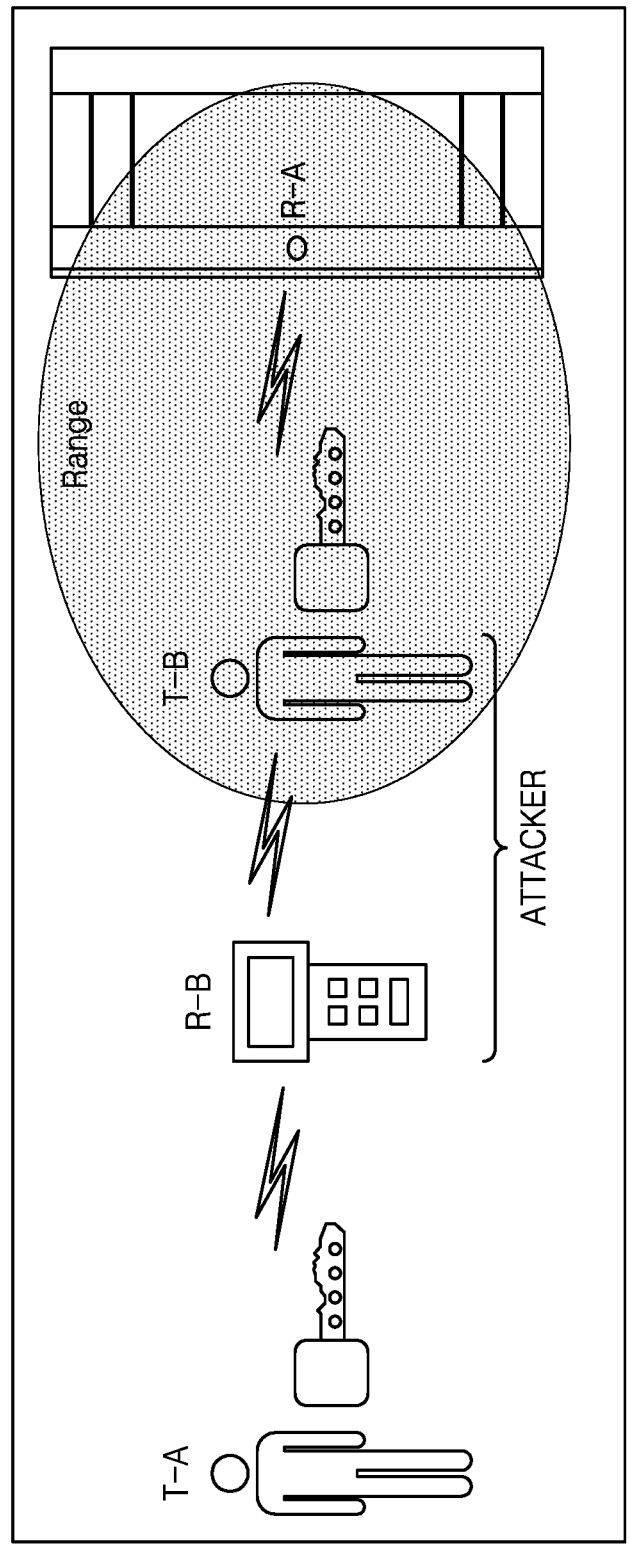
FIG. 8 illustrates a scenario where an attacker gains a right to access an electronic device, based on a relay attack.

FIG. 8 illustrates an example of a case in which a device T-A serving as a transmitter gains a distance-measurement-based access right through UWB ranging with a device R-A serving as a receiver. As illustrated in FIG. 8, an attacker T-B may gain a right to access R-A by making R-A misunderstand as if T-A is within a range where an access right is granted, by using a relay attack device R-B.

On a principle similar to the relay attack illustrated in FIG. 8, a scenario of a security attack on an HRP-ERDEV using an early path insertion strategy is also possible. An attacker may gain an access right by making the HRP-ERDEV misunderstand as if a user having an access right is within a range where an access right is granted, by using the early path insertion strategy.

Meanwhile, even when no intentional attack is made by an attacker, ranging accuracy may be reduced due to repeated or temporary interference. The reduction in ranging accuracy is more likely to occur when an SNR of an interference signal is higher than the SNR of a signal transmitted by a device participating in ranging. For example, when a plurality of HRP-ERDEVs simultaneously perform ranging through the same channel, signal collision may occur.

In general, when the number of HRP-ERDEVs is increased or when a ranging cycle is shortened, a probability of signal collision may be increased and, thus, the ranging accuracy may be reduced. Therefore, when the ranging cycle is lengthened to increase the ranging accuracy, the probability of signal collision is reduced but more time is taken to attempt new ranging.

An electronic device according to one or more embodiments calculates a distance between devices by using an STS based on an HRP UWB PHY, to prevent a relay attack or a mafia attack by an attacker using an early path insertion strategy.

According to an embodiment, a ranging security level of ERDEVs may be increased by preventing an early path insertion attack by performing integrity checking using a preamble. According to another embodiment, a ranging security level of ERDEVs may be increased by preventing an early path insertion attack by performing integrity checking using DS-TWR. According to another embodiment, a ranging security level of ERDEVs may be increased by preventing an early path insertion attack by performing integrity checking using an STS segment.

According to an embodiment, a method capable of increasing ranging accuracy as well as a security level is proposed.

A transmitting electronic device according to an embodiment may be connected to an external electronic device by using UWB communication technology. The transmitting electronic device according to an embodiment may perform ranging through a UWB RFRAME. The transmitting electronic device according to an embodiment may perform integrity checking by performing ranging by using a preamble and an STS, to perform ranging with an external electronic device through a UWB RFRAME. The transmitting electronic device according to an embodiment may perform ranging calibration by performing ranging by using a preamble and an STS, to perform ranging with an external electronic device through a UWB RFRAME.

The transmitting electronic device according to an embodiment may perform integrity checking by performing two SS-TWR processes in two round-trip measurement processes included in DS-TWR, to perform DS-TWR with an external electronic device. The transmitting electronic device according to an embodiment may perform ranging calibration by performing two SS-TWR processes in two round-trip measurement processes included in DS-TWR, to perform DS-TWR with an external electronic device.

Further, the transmitting electronic device according to an embodiment may perform integrity checking by performing ranging by using a plurality of STS segments, to perform ranging with an external electronic device through a UWB RFRAME. The transmitting electronic device according to an embodiment may perform ranging calibration by performing ranging by using a plurality of STS segments, to perform ranging with an external electronic device through a UWB RFRAME.

Meanwhile, a receiving electronic device according to an embodiment may be connected to an external electronic device by using UWB communication technology. The receiving electronic device according to an embodiment may perform ranging through a UWB RFRAME. The receiving electronic device according to an embodiment may perform integrity checking by performing ranging by using a preamble and an STS, to perform ranging with an external electronic device through a UWB RFRAME. The receiving electronic device according to an embodiment may perform ranging calibration by performing ranging by using a preamble and an STS, to perform ranging with an external electronic device through a UWB RFRAME.

The receiving electronic device according to an embodiment may perform integrity checking by performing two SS-TWR processes in two round-trip measurement processes included in DS-TWR to perform DS-TWR with an external electronic device. The receiving electronic device according to an embodiment may perform ranging calibration by performing two SS-TWR processes in two round-trip measurement processes included in DS-TWR, to perform DS-TWR with an external electronic device.

The receiving electronic device according to an embodiment may perform integrity checking by performing ranging by using a plurality of STS segments, to perform ranging with an external electronic device through a UWB RFRAME. The receiving electronic device according to an embodiment may perform ranging calibration by performing ranging by using a plurality of STS segments, to perform ranging with an external electronic device through a UWB RFRAME.

Meanwhile, an electronic device serving as a controller according to an embodiment may determine the number of frames used for DS-TWR or the number of STS segments included in a frame, and notify a controllee of the result of determination, to perform ranging with an external electronic device through a UWB RFRAME. An electronic device serving as a controller according to an embodiment may be requested by a controllee to change the number of frames used for DS-TWR and/or the number of STS segments included in a frame, to perform ranging with an external electronic device through a UWB RFRAME.

Meanwhile, an electronic device serving as a controllee according to an embodiment may receive, from a controller, the number of frames used for DS-TWR or the number of STS segments included in a frame, to perform ranging with an external electronic device through a UWB RFRAME. An electronic device serving as a controllee according to an embodiment may transmit, to a controller, a desired number of frames used for DS-TWR or a desired number of STS segments included in a frame, to perform ranging with an external electronic device through a UWB RFRAME.

Figure 9A:
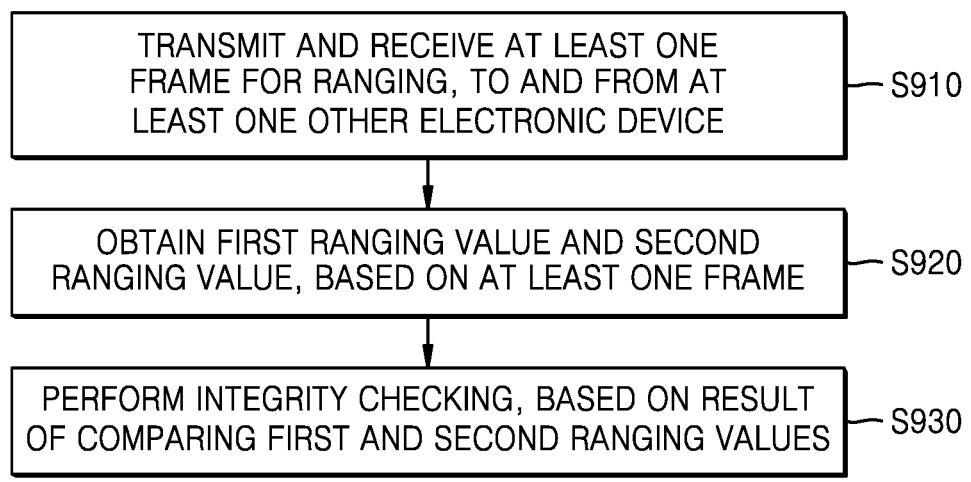
FIG. 9A is a flowchart of a method by which an electronic device performs ranging through a UWB, according to an embodiment.

FIG. 9A is a flowchart of a method by which an electronic device performs ranging by using a UWB in a wireless communication system, according to an embodiment. The method illustrated in FIG. 9A may be performed by an electronic device serving as an initiator or an electronic device serving as a responder. Alternatively, the method illustrated in FIG. 9A may be performed by an electronic device serving as a receiver or an electronic device serving as a transmitter.

Referring to FIG. 9A, in operation S910, the electronic device according to an embodiment may transmit and receive at least one frame for ranging, to and from at least one other electronic device. The electronic device may exchange RFRAMEs for ranging with the other electronic device.

In operation S920, the electronic device may obtain a first ranging value and a second ranging value, based on the at least one frame.

The electronic device may perform ranging by using an STS. When (or based on) the electronic device transmits a first frame to the other electronic device and receives a second frame from the other electronic device in response to the first frame, the electronic device may determine a reception timing of the second frame on the basis of a peak value of cross correlation of a pre-calculated STS and an STS included in the received second frame. The electronic device may calculate the ranging values, based on determined timings.

For example, the electronic device may calculate a first time $T_{round}$ from a timing at which the first frame is transmitted to a timing at which the second frame is received. The electronic device may receive, from the other electronic device, a second time $T_{reply}$ from a timing at which the other electronic device receives the first frame to a timing at which the other electronic device transmits the second frame. The electronic device may calculate a third time $T_{prop}$ taken to transmit a frame to the other electronic device, based on the calculated first time $T_{round}$ and the received second time $T_{reply}$. The electronic device may calculate a ranging value as a predicted distance between the electronic device and the other electronic device, based on the third time $T_{prop}$. A method of calculating ranging values according to SS-TWR or DS-TWR is described above in relation to FIGS. 5 to 7 and thus a repeated description thereof may not be provided herein.

The electronic device according to an embodiment may calculate the first ranging value, based on timings determined using an STS included in the at least one frame, and calculate the second ranging value, based on timing information included in a preamble included in the at least one frame.

As an example, when the electronic device is an initiator device of SS-TWR, the electronic device may transmit the first frame and receive the second frame in response to the first frame, in operation S910. The electronic device may calculate the first ranging value, based on timings determined using an STS included in each of the first frame and the second frame, and calculate the second ranging value, based on timing information included in a preamble included in the first frame and the second frame.

As another example, when the electronic device according to an embodiment is a responder device of DS-TWR, the electronic device may receive a first frame, transmit a second frame in response to the first frame, and receive a third frame in response to the second frame, in operation S910. The electronic device may calculate the first ranging value, based on timings determined using an STS included in each of the first frame, the second frame, and the third frame. The electronic device may calculate the second ranging value, based on timing information included in a preamble included in the first frame, the second frame, and the third frame.

An embodiment for performing secure and accurate ranging by using an STS and a preamble is described in detail below with reference to FIGS. 10A and 10B.

Meanwhile, an electronic device according to another embodiment may obtain the first ranging value and the second ranging value by performing two SS-TWR processes to perform DS-TWR.

As an example, when the electronic device according to an embodiment is an initiator device of DS-TWR, the electronic device may transmit a first frame, receive a second frame in response to the first frame, and transmit a third frame in response to the second frame, in operation S910. The electronic device may calculate the first ranging value, based on timings determined based on the first frame and the second frame. The electronic device may receive, from a responder device, the second ranging value calculated based on the second frame and the third frame.

As another example, when the electronic device according to an embodiment is a responder device of DS-TWR, the electronic device may receive a first frame, transmit a second frame in response to the first frame, and receive a third frame in response to the second frame, in operation S910. The electronic device may receive, from an initiator device, the first ranging value calculated based on timings determined based on the first frame and the second frame. The electronic device may calculate the second ranging value, based on the second frame and the third frame.

An embodiment for performing secure and accurate ranging by using DS-TWR is described in detail below with reference to FIGS. 11, 12, 13A to 13C, and 14.

Meanwhile, the electronic device according to an embodiment may consecutively obtain a plurality of ranging values including the first ranging value and the second ranging value. The plurality of obtained ranging values may be used for integrity checking of operation S930. A time interval between the consecutive ranging processes may be set to be equal to or shorter than a coherence time, and thus channel switching due to motion of the electronic device may be prevented.

The electronic device according to an embodiment for performing integrity checking, based on a plurality of consecutive ranging processes, may transmit and receive a first frame set including a plurality of frames for first ranging, to and from at least one other electronic device, and transmit and receive a second frame set including a plurality of frames for second ranging, to and from the at least one other electronic device, in operation S920. In this case, a time interval between a time when first ranging is performed and a time when second ranging is performed may be equal to or shorter than a preset time interval. For example, the preset time interval may include the coherence time.

The electronic device according to an embodiment may calculate the first ranging value, based on timings determined using the plurality of frames included in the first frame set, and calculate the second ranging value, based on timings determined using the plurality of frames included in the second frame set.

Meanwhile, an electronic device according to another embodiment may obtain the first ranging value and the second ranging value by using a plurality of STS segments.

As an example, the electronic device according to an embodiment may calculate the first ranging value, based on timings determined using a first STS segment included in the at least one frame. The electronic device according to an embodiment may calculate the second ranging value, based on timings determined using a second STS segment included in the at least one frame. An embodiment for performing secure and accurate ranging by using a plurality of STS segments is described in detail below with reference to FIGS. 15 and 16A to 16C.

In operation S930, the electronic device according to an embodiment may perform integrity checking, based on a result of comparing the first ranging value and the second ranging value.

When (or based on) a difference between the first ranging value and the second ranging value is included in a threshold range, the electronic device according to an embodiment may determine that ranging is properly performed by a device to which an access right is granted. When (or based on) the difference between the first ranging value and the second ranging value is less than a threshold value, the electronic device according to an embodiment may continue the authorization process to grant an access right to the other electronic device.

When the difference between the first ranging value and the second ranging value is less than the threshold value, the electronic device according to an embodiment may determine a third ranging value as a calibrated ranging value, based on the first ranging value and the second ranging value. The electronic device may grant an access right to the other electronic device, based on the third ranging value. The third ranging value may be a weighted sum of the first ranging value and the second ranging value.

Otherwise, when the difference between the first ranging value and the second ranging value is not included in the threshold range, the electronic device according to an embodiment may determine that an attack is made by a device to which an access right is not granted. When the difference between the first ranging value and the second ranging value is equal to or greater than the threshold value, the electronic device according to an embodiment may stop the authorization process.

The electronic device according to an embodiment may determine to change a ranging parameter, based on the result of integrity checking performed in operation S930.

The ranging parameter may include at least one of a ranging scheme, a ranging cycle, the number of frames used for ranging, or the number of STS segments included in a frame. For example, upon or based on determining to increase a ranging security level and/or ranging accuracy, the electronic device may increase the number of frames used for ranging and/or the number of STS segments included in a frame.

As an example, an electronic device serving as a controller may determine that reliability of a ranging value is low or that a higher security level and/or higher accuracy are required, based on the result of integrity checking. Upon determining that reliability of a ranging value is low or that a higher security level and/or higher accuracy are required, the controller device may determine to change the ranging parameter. The controller device may notify a controllee device of the change in the ranging parameter.

As another example, an electronic device serving as a controller may receive a request to change the ranging parameter, from an electronic device serving as a controllee. The controller device may determine whether the request of the controllee device is acceptable, based on the result of integrity checking. Upon determining that the request of the controllee device is acceptable, the controller device may determine to change the ranging parameter. The controller device may notify the controllee device of the change in the ranging parameter.

As still another example, an electronic device serving as a controllee may determine that the ranging parameter needs or is to be changed, based on the result of integrity checking. The controllee device may transmit, to a controller device, a request to change the ranging parameter. The controller device may determine whether the request of the controllee device is acceptable, and notify the controllee device of the result of determination.

Figure 9B:
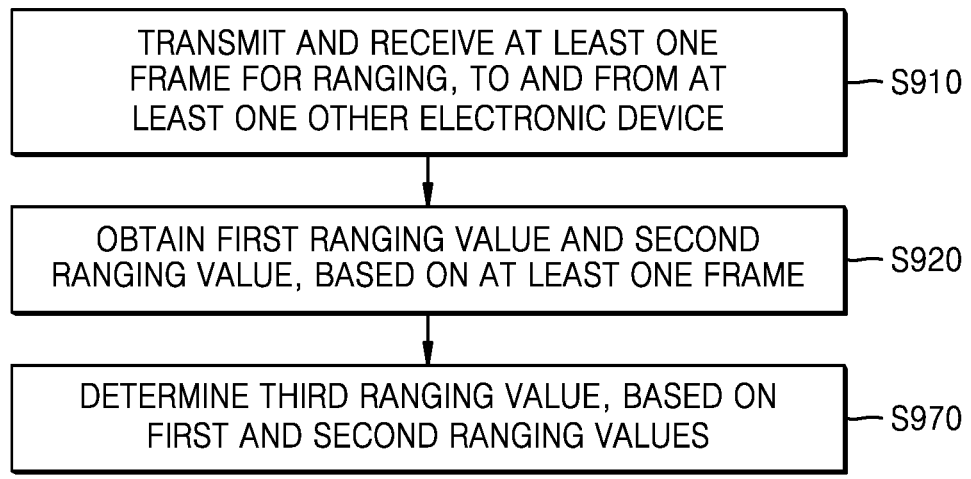
FIG. 9B is a flowchart of a method by which an electronic device performs ranging by using a UWB, according to an embodiment.

FIG. 9B is a flowchart of a method by which an electronic device performs ranging by using a UWB in a wireless communication system, according to an embodiment. Operations S910 and S920 of FIG. 9B respectively correspond to operations S910 and S920 of FIG. 9A. Therefore, a repeated description thereof may not be provided herein.

Referring to FIG. 9B, in operation S910, the electronic device according to an embodiment may transmit and receive at least one frame for ranging, to and from at least one other electronic device. The electronic device may exchange RFRAMEs for ranging with the other electronic device.

In operation S920, the electronic device may obtain a first ranging value and a second ranging value, based on the at least one frame.

As an example, the electronic device may obtain the first ranging value and the second ranging value by using an STS and a preamble. As another example, the electronic device may obtain the first ranging value and the second ranging value by performing two SS-TWR processes to perform DS-TWR. As another example, the electronic device may obtain the first ranging value and the second ranging value by using a plurality of STS segments. As another example, the electronic device may obtain the first ranging value and the second ranging value by using a plurality of consecutive ranging processes.

In operation S970, the electronic device may perform ranging calibration, based on the first ranging value and the second ranging value. The electronic device may determine a third ranging value, based on the first ranging value and the second ranging value.

When (or based on) a difference between the first ranging value and the second ranging value is included in a threshold range, the electronic device according to an embodiment may determine that ranging is properly performed by a device to which an access right is granted. When (or based on) the difference between the first ranging value and the second ranging value is less than a threshold value, the electronic device according to an embodiment may obtain the third ranging value as a final ranging result value by performing ranging calibration. The third ranging value may be expressed as a weighted sum of the first ranging value and the second ranging value. The electronic device may grant an access right to the other electronic device, based on the third ranging value.

Otherwise, when the difference between the first ranging value and the second ranging value is not included in the threshold range, the electronic device according to an embodiment may determine that at least one of the first ranging value and the second ranging value is greatly affected by interference. When the difference between the first ranging value and the second ranging value is equal to or greater than the threshold value, the electronic device according to an embodiment may stop the ranging calibration process.

The electronic device according to an embodiment may determine to change a ranging parameter, based on the result of ranging calibration performed in operation S970.

The ranging parameter may include at least one of a ranging scheme, a ranging cycle, the number of frames used for ranging, or the number of STS segments included in a frame. For example, upon or based on determining to increase a ranging security level and/or ranging accuracy, the electronic device may increase the number of frames used for ranging and/or the number of STS segments included in a frame.

As an example, an electronic device serving as a controller may determine that reliability of a ranging value is low or that higher ranging accuracy is required. Upon determining that reliability of a ranging value is low or that higher accuracy is required, the controller device may determine to change the ranging parameter. The controller device may notify a controllee device of the change in the ranging parameter.

As another example, an electronic device serving as a controller may receive a request to change the ranging parameter, from an electronic device serving as a controllee. The controller device may determine whether the request of the controllee device is acceptable, based on the result of ranging calibration. Upon determining that the request of the controllee device is acceptable, the controller device may determine to change the ranging parameter. The controller device may notify the controllee device of the change in the ranging parameter.

As still another example, an electronic device serving as a controllee may determine that the ranging parameter needs or is to be changed, based on the result of ranging calibration. The controllee device may transmit, to a controller device, a request to change the ranging parameter. The controller device may determine whether the request of the controllee device is acceptable, and notify the controllee device of the result of determination.

A method of operating an electronic device for performing ranging, according to various embodiments, will now be described with reference to FIGS. 10A, 10B, 11, 12, 13A to 13C, 14, 15, 16A to 16C, and 17.

Initially, an electronic device according to an embodiment may implement a method of performing ranging by using both a preamble and an STS to prevent an attack using an early path insertion strategy. The electronic device may determine whether an attack is made, by performing integrity checking by comparing a ranging value calculated using a preamble with a ranging value calculated using an STS. According to an embodiment, a security level of an HRP-ERDEV may be increased through integrity checking.

FIG. 10A is a flowchart of a method by which an electronic device performs ranging and integrity checking by using an STS and a preamble, according to an embodiment.

Referring to FIG. 10a, in operation S1010, the electronic device according to an embodiment may set up a communication connection with another HRP-ERDEV through UWB communication, and transmit and receive an RFRAME for distance measurement.

In operation S1020, the electronic device may determine a ranging method, and transmit and receive the RFRAME according to the ranging method.

To perform SS-TWR, in operation S1040, the electronic device may measure a preamble-based ranging result value $T_p$ and an STS-based ranging result value $T_{sts}$ and then compare $T_p$ with $T_{sts}$. In operation S1040, the electronic device according to an embodiment may be an initiator ERDEV having transmitted a first RFRAME.

To perform DS-TWR, in operation S1030, the electronic device may measure a preamble-based ranging result value $T_p$ and an STS-based ranging result value $T_{sts}$ and then compare $T_p$ with $T_{sts}$. In operation S1030, the electronic device according to an embodiment may be a responder ERDEV having received a first RFRAME.

In operation S1050, the electronic device may determine whether a difference between $T_p$ and $T_{sts}$ is equal to or greater than a threshold value (e.g., a pre-set, pre-stored, or pre-determined threshold value).

For example, when (or based on) a threshold value $V_{th}$ for integrity checking is given and $|T_p-T_{sts}| \geq V_{th}$ is satisfied, the electronic device may determine that the other ERDEV is an attacker. Upon determining that the other device is an attacker, in operation S1060, the electronic device may stop the authorization process and not grant an access right to the other device. When (or based on) the condition $|T_p-T_{sts}| \geq V_{th}$ is not satisfied, in operation S1070, the electronic device may determine that the other ERDEV is not an attacker, but is a target ERDEV, and continue the authorization process to grant an access right to the other ERDEV.

Compared to a method using only an STS for ranging, the method using a preamble and an STS together for ranging according to an embodiment may reduce a probability of success of an attack by an attacker. For a successful attack on ranging using a preamble and an STS according to an embodiment, the attacker needs to make the same early path insertion attack once in a preamble period and once in an STS period.

For example, it is assumed that a probability of success of an early path insertion attack on a ranging method using only an STS is $p_{sts}$ ($p_{sts} \leq 1$), that a probability of success of an early path insertion attack on a ranging method using only a preamble is $p_p$ ($p_p \leq 1$), and that a probability of satisfying a condition $|T_p-T_{sts}| \leq V_{th}$ is $p_{th}$ ($p_{th} \leq 1$). In this case, although the probability of success of an attack by an attacker in the general environment using only an STS for ranging is $p_{sts}$, when a preamble and an STS are used together for ranging according to an embodiment, the probability of success of an attack by an attacker may be reduced to $p_{sts} \cdot p_p \cdot p_{th}$.

A device for calculating a ToF corresponding to a ranging result value according to an embodiment may vary depending on a ranging scheme used by the electronic devices. For example, an initiator device may calculate ToF when SS-TWR is used, or a responder device may calculate ToF when DS-TWR is used. Thus, a device for performing integrity checking may also vary depending on the used ranging scheme. However, when the two devices participating in ranging exchange ranging result values, integrity checking may be performed by any device. The operation of exchanging the ranging result values may be performed in-band or out-of-band.

For ranging calibration, the electronic device according to an embodiment may perform ranging by using both a preamble and an STS and perform ranging calibration based on two ranging values, thereby increasing ranging accuracy of the HRP-ERDEV.

Figure 10B:
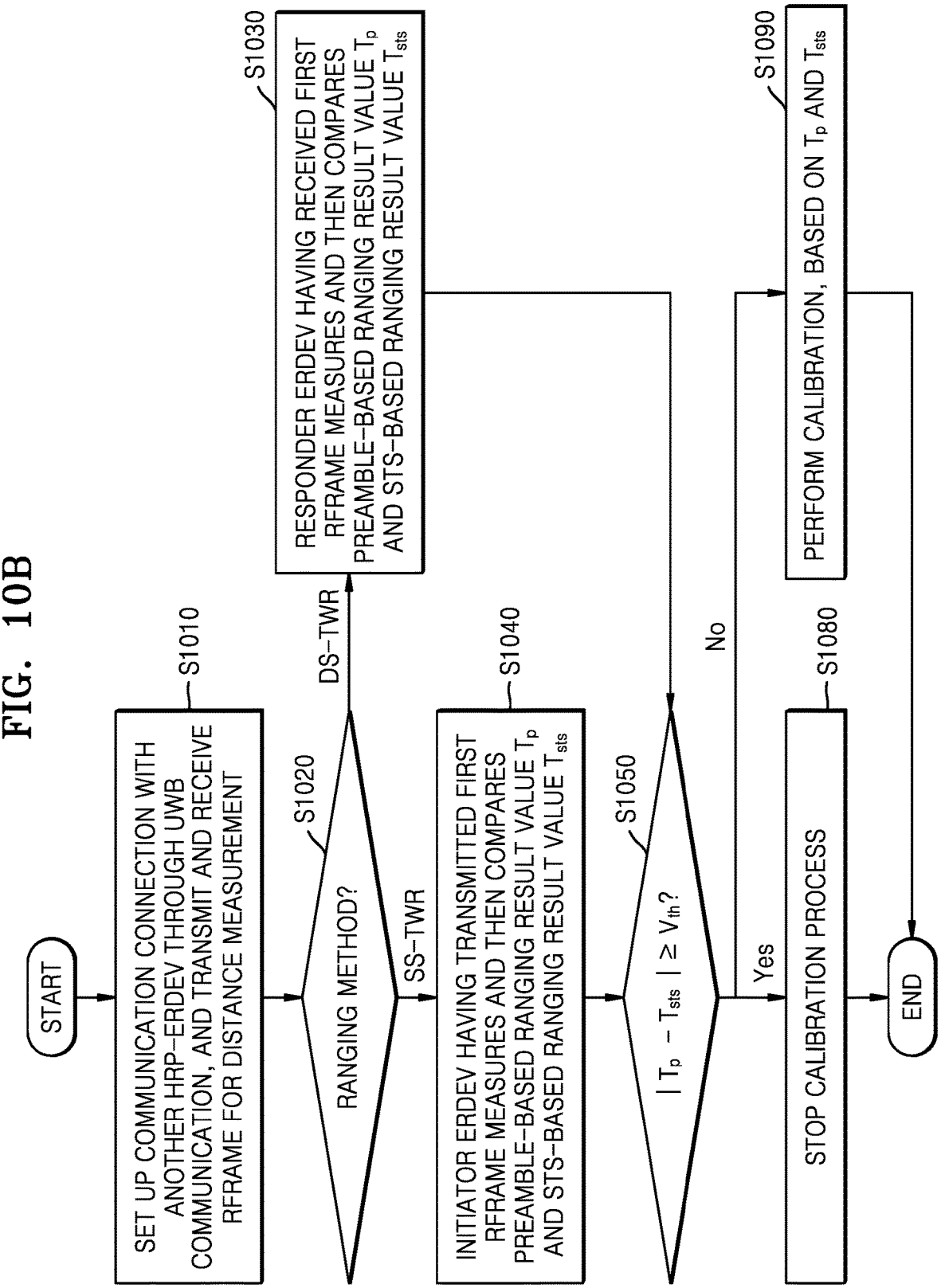
FIG. 10B is a flowchart of a method by which an electronic device performs ranging calibration by using an STS and a preamble, according to an embodiment.

Operations S1010, S1020, S1030, S1040, and S1050 of FIG. 10B respectively correspond to operations S1010, S1020, S1030, S1040, and S1050 of FIG. 10A, and thus a repeated description thereof may not be provided herein.

In operation S1050, the electronic device may determine whether a difference between $T_p$ and $T_{sts}$ is equal to or greater than a threshold value.

For example, it is assumed that the threshold value for ranging calibration is pre-determined as $V_{th}$. After the preamble-based ranging result value $T_p$ and the STS-based ranging result value $T_{sts}$ are measured, when (or based on) a condition $|T_p-T_{sts}| \geq V_{th}$ is satisfied, the electronic device may determine that at least one of the two ranging values is greatly affected by interference, and stop the calibration process (operation S1080). When (or based on) the ranging result values do not satisfy the condition $|T_p-T_{sts}| \geq V_{th}$, the electronic device may perform ranging calibration, based on $T_p$ and $T_{sts}$ (operation S1090).

The electronic device according to an embodiment use $T_{result}$ as a final ranging result value by performing ranging calibration according to [Equation 3] below. In [Equation 3], a is a parameter closely related to a ranging channel and noise, and is determined as a value optimized based on a desired utility function in implementing the electronic device.

$$T_{result} = a \times T_p + (1-a) \times T_{sts}, \text{ for } 0 \leq a \leq 1$$

Figure 11:
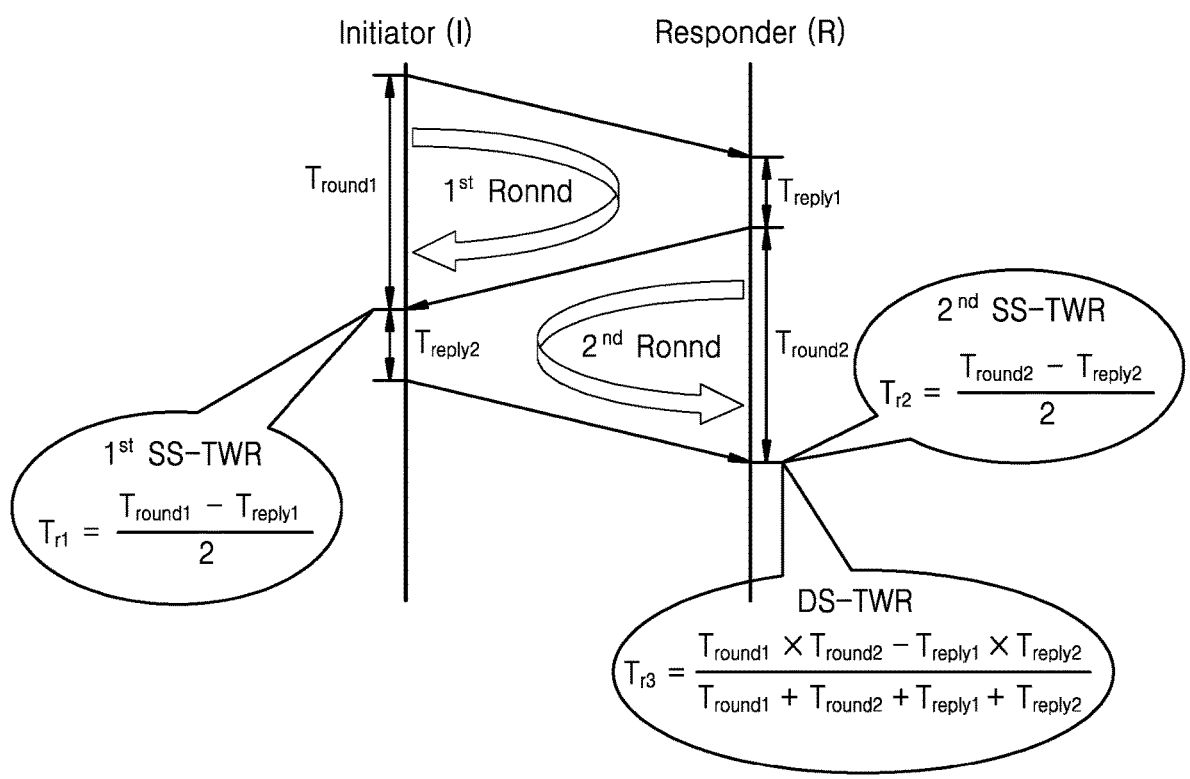
FIG. 11 is a diagram for describing a method by which an electronic device performs ranging and integrity checking by using DS-TWR, according to an embodiment.

Meanwhile, FIGS. 11 and 12 illustrate a method by which an electronic device performs ranging and integrity checking by using DS-TWR, according to another embodiment.

A method of performing integrity checking, according to an embodiment, by performing two SS-TWR processes considerable for DS-TWR using three frames may be used to prevent an attack using an early path insertion strategy. According to an embodiment, it may be determined whether an attack is made, by performing integrity checking by comparing two ranging values calculated by performing two SS-TWR processes. According to an embodiment, a security level of an HRP-ERDEV may be increased through integrity checking.

FIG. 11 is a conceptual view of an integrity checking method for DS-TWR.

As illustrated in FIG. 11, for DS-TWR using three frames, two round-trip measurement processes may be considered. When an initiator device I obtains a value $T_{reply1}$ through a first round-trip measurement process, the initiator device I may calculate a ranging result value $T_{r1}$ according to an equation $T_{r1}=(T_{round1}-T_{reply1})/2$. When a responder device R obtains a value $T_{reply2}$ through a second round-trip measurement process, the responder device R may calculate a ranging result value $T_{r2}$ according to an equation $T_{r2}=(T_{round2}-T_{reply2})/2$.

When a threshold value $V_{th}$ for integrity checking is given and a condition $|T_{r1}-T_{r2}| \geq V_{th}$ is satisfied, an electronic device according to an embodiment of may determine that another ERDEV is an attacker. Upon determining that the other device is an attacker, the electronic device may stop the authorization process and not grant an access right to the other device. When the condition $|T_{r1}-T_{r2}| \geq V_{th}$ is not satisfied, the electronic device may determine that the other ERDEV is not an attacker, but is as a target ERDEV, and continue the authorization process to grant an access right to the other ERDEV.

FIG. 12 is a flowchart of a method by which an electronic device performs ranging and integrity checking by using DS-TWR, according to an embodiment.

Referring to FIG. 12, in operation S1210, the electronic device according to an embodiment may set up a communication connection with another HRP-ERDEV through UWB communication, and transmit and receive an RFRAME for distance measurement.

In operation S1220, the electronic device may obtain a ranging result value $T_{r1}$ through a first round-trip measurement process.

As an example, when the electronic device is an initiator device, the electronic device may calculate the value $T_{r1}$ by using a directly calculated value $T_{round1}$ and a value $T_{reply1}$ received from a responder device.

As another example, when the electronic device is a responder device, the electronic device may receive the value $T_{r1}$ from an initiator device.

In operation S1230, the electronic device may obtain a ranging result value $T_{r2}$ through a second round-trip measurement process.

As an example, when the electronic device is an initiator device, the electronic device may receive the value $T_{r2}$ from a responder device.

As another example, when the electronic device is a responder device, the electronic device may calculate the value $T_{r2}$ by using a directly calculated value $T_{round2}$ and a value $T_{reply2}$ received from an initiator device.

In operation S1240, the electronic device may determine whether a difference between $T_{r1}$ and $T_{r2}$ is equal to or greater than a threshold value $V_{th}$. The SS-TWR result values calculated by the two devices may be exchanged, and thus any of the two devices may perform integrity checking.

As an example, when integrity checking is performed by an initiator device, a responder device may transmit a second SS-TWR result value $T_{r2}$ to the initiator device through in-band or out-of-band signaling. The initiator device may determine whether an attack is made, based on a first SS-TWR result value $T_{r1}$ calculated by the initiator device and the second SS-TWR result value $T_{r2}$ received from the responder device.

As another example, when integrity checking is performed by a responder device, an initiator device may transmit a first SS-TWR result value $T_{r1}$ to the responder device through in-band or out-of-band signaling. The responder device may determine whether an attack is made, based on the first SS-TWR result value $T_{r1}$ received from the initiator device and a second SS-TWR result value $T_{r2}$ directly calculated by the responder device.

When the difference between $T_{r1}$ and $T_{r2}$ is equal to or greater than the threshold value $V_{th}$, in operation S1250, the electronic device according to an embodiment may determine that an attack is detected, and stop the authorization process. When the difference between $T_{r1}$ and $T_{r2}$ is less than the threshold value $V_{th}$, in operation S1260, the electronic device may determine that an attack is not detected, and continue the authorization process to grant an access right to the other device.

Both preamble-based ranging and STS-based ranging may be applied to the ranging method according to the embodiment illustrated in FIGS. 11 and 12. The embodiment illustrated in FIGS. 11 and 12 may be used together with the embodiment illustrated in FIG. 10A with respect to the method of performing integrity checking by using a preamble. That is, to calculate two ranging values through two SS-TWR processes included in DS-TWR according to an embodiment, STS-based ranging may be performed, preamble-based ranging may be performed, or STS-based ranging and preamble-based ranging may be performed together.

The method of performing ranging integrity checking by using two round-trip measurement processes included in DS-TWR according to an embodiment may reduce a probability of success of an attack. For a successful attack on two SS-TWR processes considerable for DS-TWR according to an embodiment, an attacker needs to make the same early path insertion attack once in a first round-trip measurement process and once in a second round-trip measurement process.

For example, it is assumed that a probability of success of an attack due to early path insertion in general DS-TWR is $p_r$ ($p_r \leq 1$), that a probability of success of an attack due to early path insertion in a first round-trip measurement process is $p_{r1}$ ($p_{r1} \leq 1$), that a probability of success of an attack due to early path insertion in a second round-trip measurement process is $p_{r2}$ ($p_{r2} \leq 1$), and that a probability of satisfying a condition $|T_{r1}-T_{r2}| \leq V_{th}$ is $p_{th}$ ($p_{th} \leq 1$). In this case, although the probability of success of an attack by an attacker in the environment using general DS-TWR is $p_r$, when integrity checking is performed using two round-trip measurement processes according to an embodiment, the probability of success of an attack by an attacker may be greatly reduced to $p_{r1} \cdot p_{r2} \cdot p_{th}$.

Figure 13A:
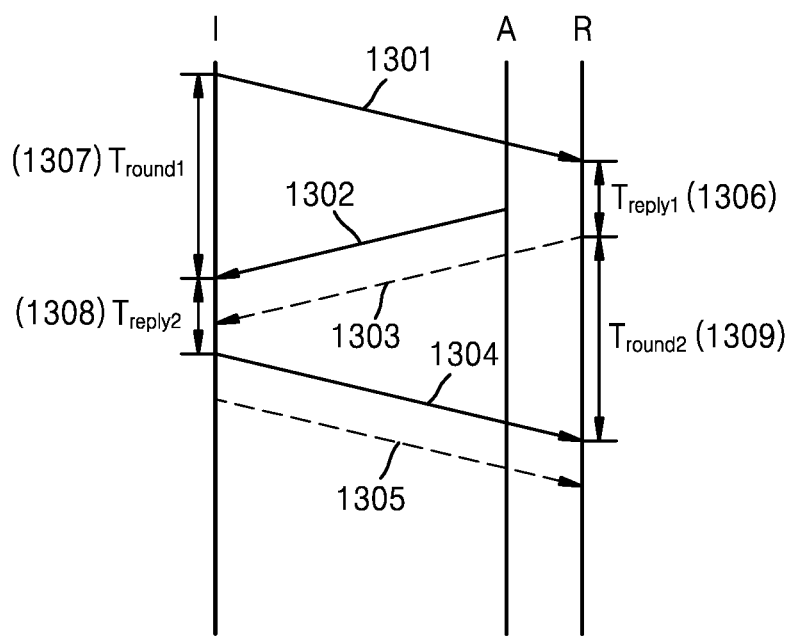
FIG. 13A is a diagram for describing scenarios where an electronic device performing ranging by using DS-TWR is attacked by an attacker, according to embodiments.
Figure 13B:
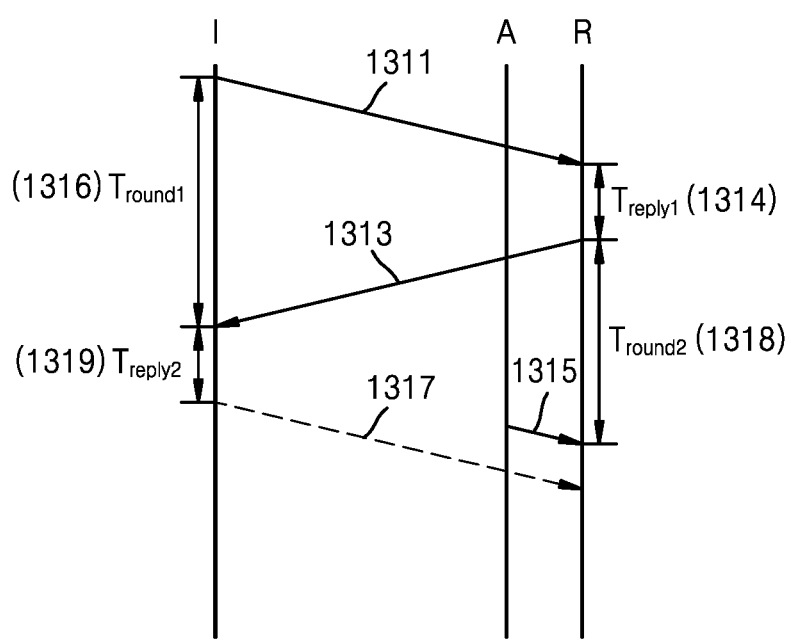
FIG. 13B is a diagram for describing scenarios where an electronic device performing ranging by using DS-TWR is attacked by an attacker, according to embodiments.

However, when the electronic device according to an embodiment performs ranging by using DS-TWR, an attack may be made by an attacker according to scenarios illustrated in FIGS. 13A and 13B.

Referring to FIG. 13A, when normal DS-TWR is performed, an initiator device I and a responder device R may perform ranging by transmitting and receiving a first frame 1301, a second frame 1303, and a third frame 1305.

However, when an attacker device A makes an early path insertion attack on $T_{round1}$ as illustrated in FIG. 13A, the effect of early path insertion may also affect $T_{round2}$ and thus integrity checking may be passed.

Specifically, the initiator device I may transmit the first frame 1301 to the responder device R, and receive an attack frame 1302 of the attacker device A before the second frame 1303 is received from the responder device R. The initiator device I may transmit a fourth frame 1304 to the responder device R in response to the attack frame 1302.

The initiator device I may calculate $T_{round1}$ 1307, based on a transmission timing of the first frame 1301 and a reception timing of the attack frame 1302, and calculate $T_{reply2}$ 1308, based on the reception timing of the attack frame 1302 and a transmission timing of the fourth frame 1304. The responder device R may calculate $T_{reply1}$ 1306, based on a reception timing of the first frame 1301 and a transmission timing of the second frame 1303, and calculate $T_{round2}$ 1309, based on the transmission timing of the second frame 1303 and a reception timing of the fourth frame 1304. The responder device R may receive $T_{round1}$ 1307 and $T_{reply2}$ 1308 from the initiator device I. The responder device R may estimate a distance between the responder device R and the initiator device I, based on $T_{reply1}$ 1306, $T_{round1}$ 1307, $T_{reply2}$ 1308, and $T_{round2}$ 1309.

Therefore, the responder device R estimates a distance shorter than an actual distance, due to jamming of the attacker A. However, in spite of jamming of the attacker A, a ranging result value $T_{r1}$ calculated based on a first round-trip and a ranging result value $T_{r2}$ calculated based on a second round-trip may be estimated as the same value that is less than a ToF for the real distance. Thus, an attack according to the scenario illustrated in FIG. 13A may pass the integrity checking illustrated in FIGS. 11 and 12 according to an embodiment.

Unlike the attack scenario illustrated in FIG. 13A, a probability of success of an attack according to the scenario illustrated in FIG. 13B may be mitigated through integrity checking according to an embodiment. Referring to FIG. 13B, when normal DS-TWR is performed, an initiator device I and a responder device R may perform ranging by transmitting and receiving a first frame 1311, a second frame 1313, and a third frame 1317.

However, an attacker device A may make an early path insertion attack on $T_{round2}$ as illustrated in FIG. 13B. Due to the attack by the attacker device A, the responder device R may estimate a distance between the responder device R and the initiator device I, based on $T_{reply1}$ 1314, $T_{round1}$ 1316, $T_{reply2}$ 1319, and $T_{round2}$ 1318.

Therefore, the responder device R estimates a distance shorter than an actual distance, due to jamming of the attacker A. Because a ranging result value $T_{r1}$ calculated based on a first round-trip is different from a ranging result value $T_{r2}$ calculated based on a second round-trip, the responder device R determines that an attack is detected, and stops the authentication process. Unlike the attack according to the scenario illustrated in FIG. 13A, the attack according to the scenario illustrated in FIG. 13B may not easily pass the integrity checking illustrated in FIGS. 11 and 12 according to an embodiment.

Figure 13C:
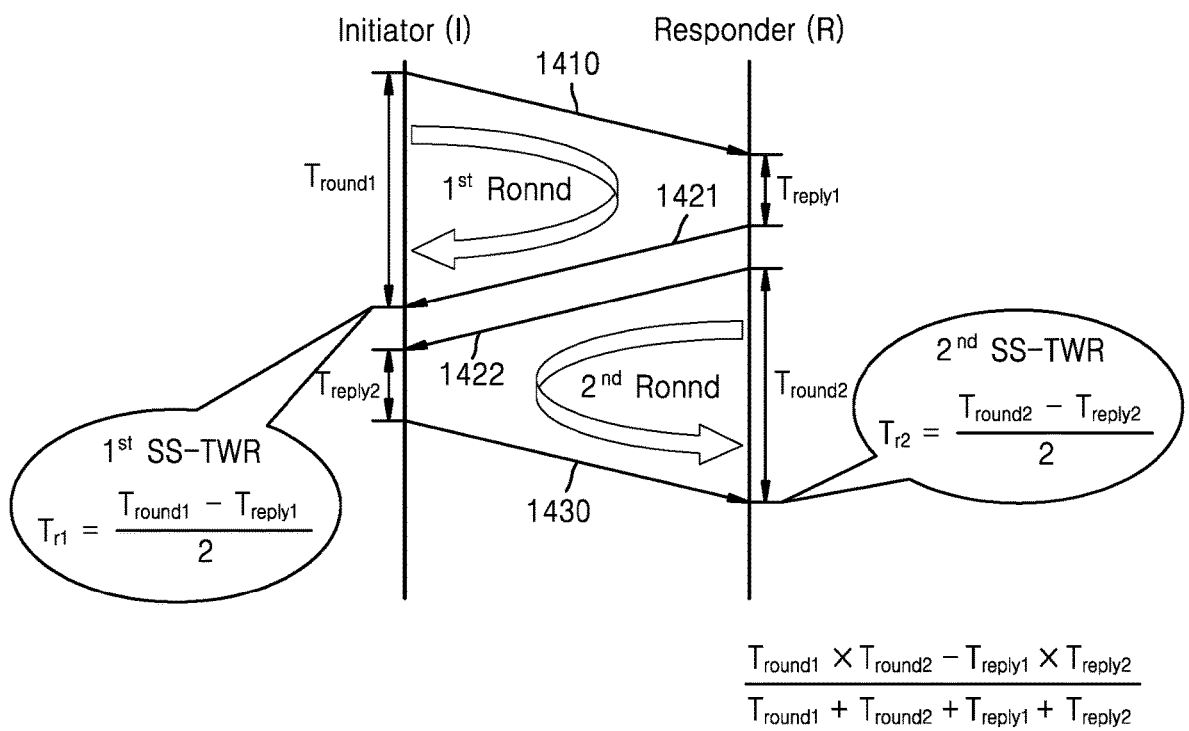
FIG. 13C is a diagram for describing a method by which an electronic device performs ranging by using DS-TWR applied to enhance security from an attack, according to an embodiment.

The electronic device according to an embodiment may implement a method of performing DS-TWR using four frames, to prevent the attack scenario illustrated in FIG. 13A. The electronic device according to an embodiment may enhance integrity checking by performing DS-TWR using four frames 1410, 1421, 1422, and 1430 as illustrated in FIG. 13C. The DS-TWR method using four frames according to an embodiment may be performed considering various cases depending on a device for performing integrity checking.

As an example, when integrity checking is performed by an initiator device, a responder device may transmit a second SS-TWR result value $T_{r2}$ to the initiator device through in-band or out-of-band signaling. The initiator device may determine whether an attack is made, based on a first SS-TWR result value $T_{r1}$ calculated by the initiator device and the second SS-TWR result value $T_{r2}$ received from the responder device.

As another example, when integrity checking is performed by a responder device, an initiator device may transmit a first SS-TWR result value $T_{r1}$ to the responder device through in-band or out-of-band signaling. The responder device may determine whether an attack is made, based on the first SS-TWR result value $T_{r1}$ received from the initiator device and a second SS-TWR result value $T_{r2}$ directly calculated by the responder device.

Both preamble-based ranging and STS-based ranging may be applied to the ranging method according to the embodiment illustrated in FIG. 13C. The embodiment illustrated in FIG. 13C may be used together with the embodiment illustrated in FIG. 10A with respect to the method of performing integrity checking by using a preamble.

The electronic device according to an embodiment may perform a ranging calibration method capable of increasing ranging accuracy of an HRP-ERDEV by performing ranging calibration, based on two SS-TWR result values and a DS-TWR result value obtainable in DS-TWR. Referring to FIG. 11, the electronic device according to an embodiment may perform ranging by using all of two SS-TWR result values $T_{r1}$ and $T_{r2}$ and a DS-TWR result value $T_{r3}$, and perform ranging calibration, based on the three ranging values $T_{r1}$, $T_{r2}$, and $T_{r3}$.

Figure 14:
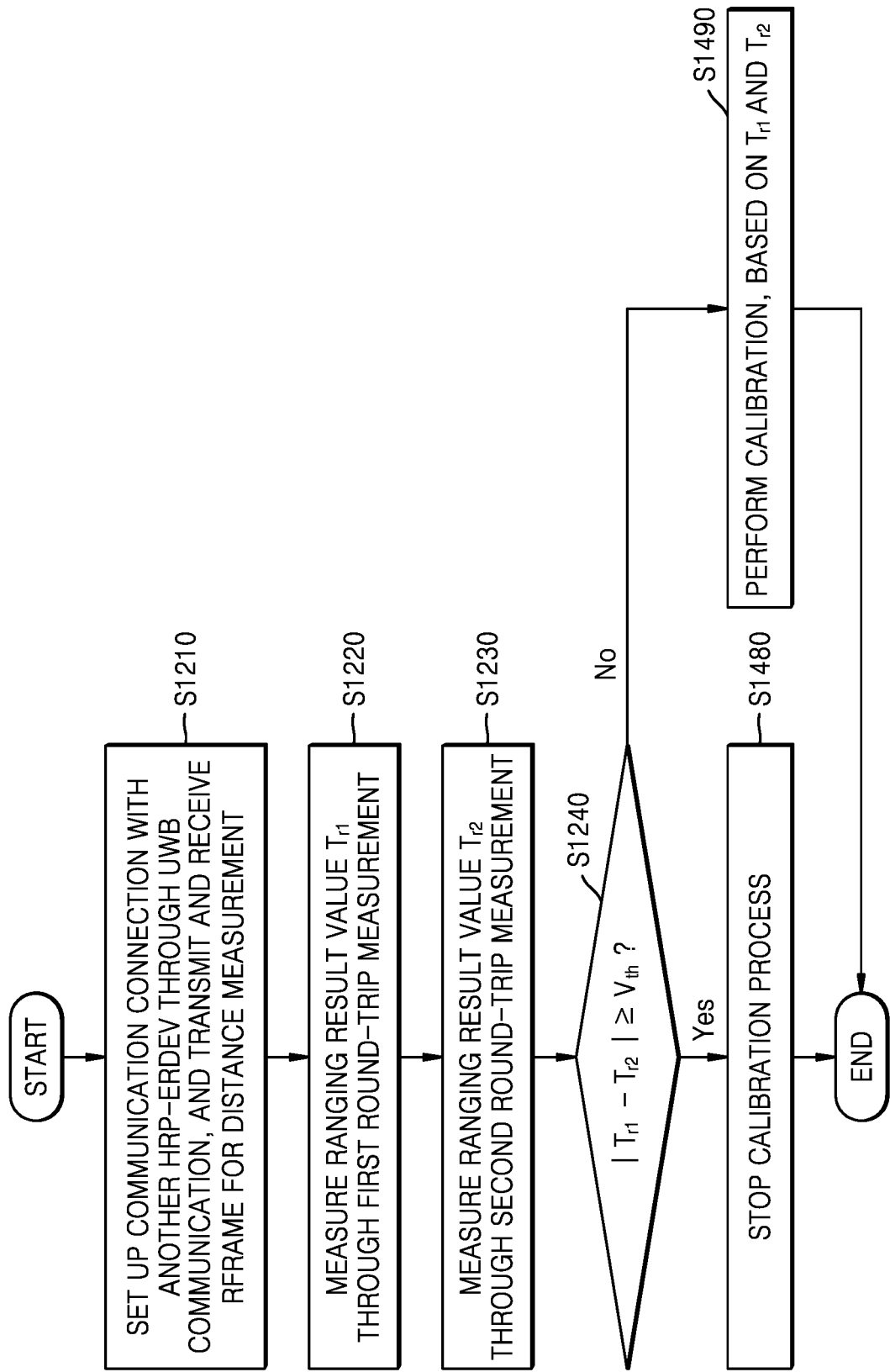
FIG. 14 is a flowchart of a method by which an electronic device performs ranging calibration by using DS-TWR, according to an embodiment.
Figure 15:
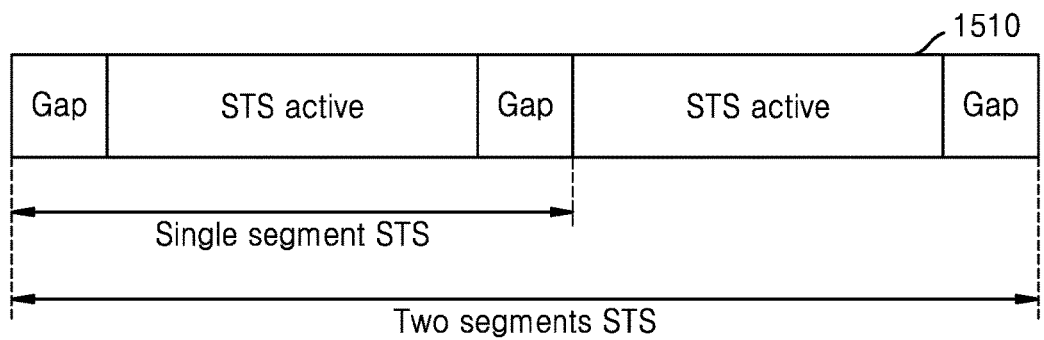
FIG. 15 is a diagram for describing STS segments defined in a PHY layer of a high rate pulse (HRP) UWB.

FIG. 14 is a flowchart of a method by which an electronic device performs ranging and ranging calibration by using DS-TWR, according to an embodiment.

Operation S1210, S1220, S1230, and S1240 of FIG. 14 respectively correspond to operation S1210, S1220, S1230, and S1240 of FIG. 12 and thus a repeated description thereof may not be provided herein.

Referring to FIG. 14, in operation S1240, the electronic device according to an embodiment may determine whether a difference between $T_{r1}$ and $T_{r2}$ is equal to or greater than a threshold value.

For example, it is assumed that the threshold value for ranging calibration is pre-determined as $V_{th}$. After a first SS-TWR result value $T_{r1}$ and a second SS-TWR result value $T_{r2}$ are measured, when (or based on) a condition $|T_{r1}-T_{r2}| \geq V_{th}$ is satisfied, the electronic device according to an embodiment may determine that at least one of the two ranging values is greatly affected by interference, and stop the calibration process (operation S1480). When the ranging result values do not satisfy the condition $|T_{r1}-T_{r2}| \geq V_{th}$, the electronic device may perform ranging calibration, based on $T_{r1}$ and $T_{r2}$ (operation S1490).

The electronic device according to an embodiment may use $T_{result}$ as a final ranging result value by performing ranging calibration according to [Equation 4] below. In [Equation 4], a and b are parameters closely related to a ranging channel and noise, and are determined as values optimized based on a desired utility function in implementing the electronic device.

$$T_{result}=a \times T_{r1}+b \times T_{r2}+(1-a-b) \times T_{r3}, \text{ for } 0 \leq a,b \leq 1 \quad \text{[Equation 4]}$$

Both preamble-based ranging and STS-based ranging may be applied to the ranging method according to the embodiment illustrated in FIG. 14. The embodiment illustrated in FIG. 14 may be used together with the embodiment illustrated in FIG. 10A with respect to the method of performing integrity checking by using a preamble. That is, to calculate two ranging values through two SS-TWR processes included in DS-TWR according to an embodiment, STS-based ranging may be performed, preamble-based ranging may be performed, or STS-based ranging and preamble-based ranging may be performed together.

Meanwhile, according to an embodiment, FIGS. 15, 16A, 16B, and FIG. 16C illustrate a method by which an electronic device performs ranging by using a plurality of STS segments. According to an embodiment using a plurality of STS segments, an attack using an early path insertion strategy may be prevented and ranging accuracy may be increased.

The concept of the STS segment is defined for an HRP UWB PHY of IEEE 802.15.4z. One to four STS pulse sequence blocks may be included in a data unit together with a gap indicating an interval of about silent 1 μs (512 chips). An example 1510 of FIG. 15 indicates a case considering two STS segments. A table of FIG. 15 specifies information related to STS segments supported in base pulse repetition frequency (BPRF) and higher pulse repetition frequency (HPRF) modes supported by the HRP UWB PHY of IEEE 802.15.4z. Referring to a second row 1520 of the table of FIG. 15, the HPRF mode supported by the HRP UWB PHY of IEEE 802.15.4z may support one to four STS segments.

Figure 16A:
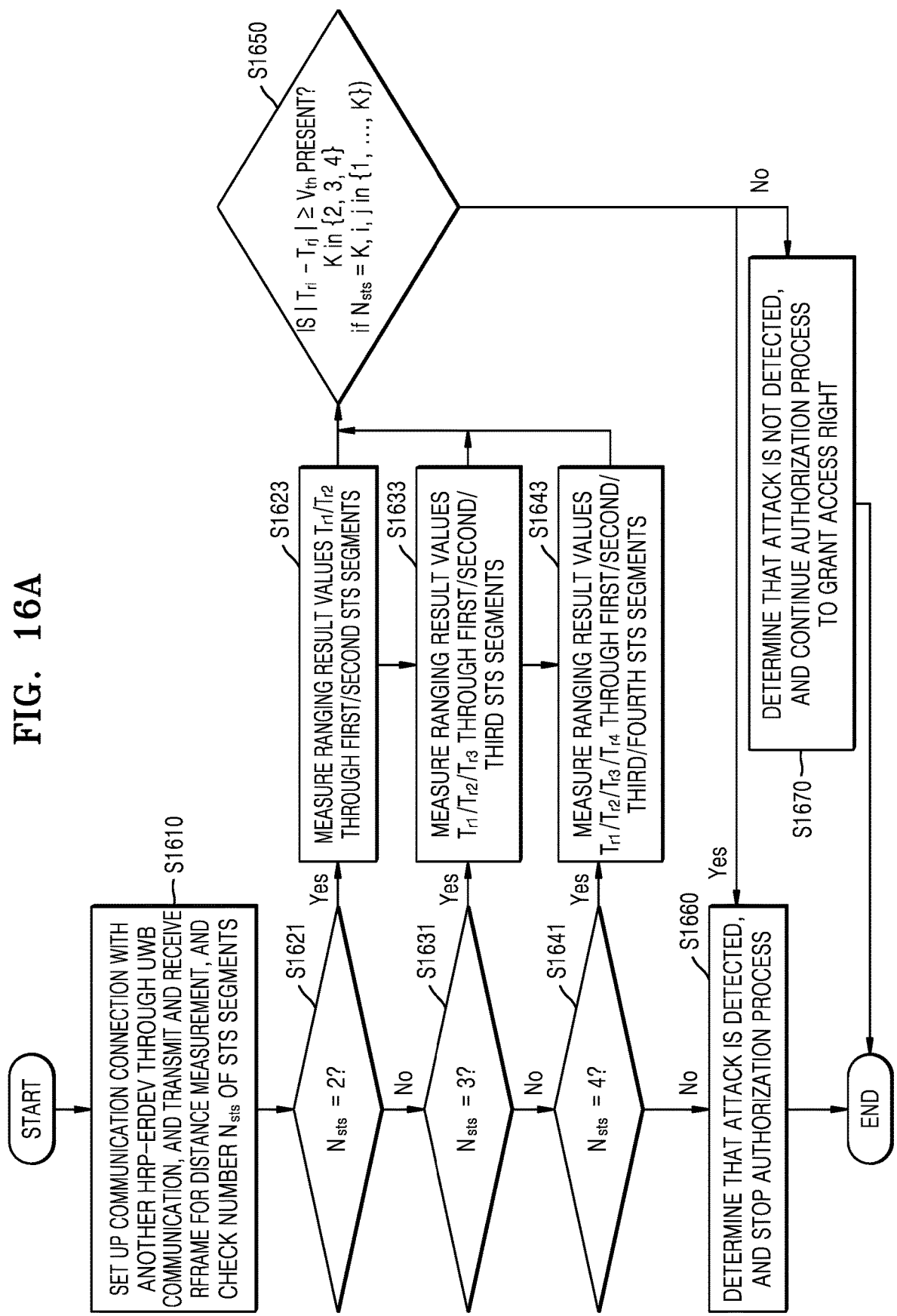
FIG. 16A is a flowchart of a method by which an electronic device performs ranging and integrity checking by using a plurality of STS segments, according to an embodiment.

A method of performing integrity checking according to an embodiment measures a ranging result value per segment by using a plurality of STS segments, and compares the measured values. FIG. 16A is a flowchart of a method by which an electronic device performs ranging and integrity checking by using a plurality of STS segments, according to an embodiment.

Referring to FIG. 16A, in operation S1610, the electronic device according to an embodiment may set up a communication connection with another HRP-ERDEV through UWB communication, and transmit and receive an RFRAME for distance measurement. In addition, the electronic device may check the number $N_{STS}$ of STS segments included in a frame.

When (or based on) the electronic device according to an embodiment determines $N_{STS}=2$ in operation S1621, the electronic device may measure a ranging result value $T_{r1}$ by using a first STS segment and measure a ranging result value $T_{r2}$ by using a second STS segment in operation S1623.

When (or based on) the electronic device according to an embodiment determines $N_{STS}=3$ in operation S1631, the electronic device may measure a ranging result value $T_{r1}$ by using a first STS segment, measure a ranging result value $T_{r2}$ by using a second STS segment, and measure a ranging result value $T_{r3}$ by using a third STS segment in operation S1633.

When the electronic device according to an embodiment determines $N_{STS}=4$ in operation S1641, the electronic device may measure $T_{r1}$ by using a first STS segment, measure $T_{r2}$ by using a second STS segment, measure $T_{r3}$ by using a third STS segment, and measure $T_{r4}$ by using a fourth STS segment in operation S1643.

In operation S1650, the electronic device may determine whether a difference between the measured ranging result values is equal to or greater than a threshold value.

When a case in which the difference between the measured ranging result values is equal to or greater than the threshold value is present, in operation S1660, the electronic device according to an embodiment may determine that an attack is detected, and stop the authorization process. When a case in which the difference between the measured ranging result values is equal to or greater than the threshold value is not present, in operation S1670, the electronic device may determine that an attack is not detected, and continue the authorization process to grant an access right to the other device.

The method of performing ranging integrity checking according to the embodiment illustrated in FIG. 16A may reduce a probability of success of an attack.

For example, when i is a value selected from among {1, 2, 3, 4}, it is assumed that a probability of success of an early path insertion attack by an attacker on an STS segment having the index i is psi. In this case, although the probability of success of an attack by an attacker in a general environment using only one STS segment for ranging is psi, when integrity checking is performed on ranging values measured using two STS segments according to an embodiment, the probability of success of an attack by an attacker may be reduced to $p_{r1} \cdot p_{r2} \cdot p_{r3} \cdot p_{th}$. It is assumed that $p_{th}$ ($p_{th} \le 1$) is a probability of satisfying a condition that the difference between the ranging value $T_{r1}$ measured using the first STS segment and the ranging value $T_{r2}$ measured using the second STS segment is equal to or less than a threshold value $V_{th}$.

When integrity checking is performed on ranging values measured using three STS segments according to an embodiment, the probability of success of an attack by an attacker may be reduced to $p_{r1} \cdot p_{r2} \cdot p_{r3} \cdot p_{th}$. When integrity checking is performed on ranging values measured using four STS segments according to an embodiment, the probability of success of an attack by an attacker may be reduced to $p_{r1} \cdot p_{r2} \cdot p_{r3} \cdot p_{r4} \cdot p_{th}$. That is, when the number of sts segments used for ranging is increased, a ranging security level of an STS is also increased.

According to an embodiment, considering a processing speed of a device participating in ranging, reliability of a ranging result value may vary depending on STS segments. Thus, $V_{th}$ used as a criterion for determining whether an attack is detected in operation S1650 of FIG. 16A may be applied as a different value depending on STS segments. By performing the method illustrated in FIG. 16A, the electronic device according to an embodiment may use a plurality of STS segments not only to increase ranging accuracy, but also to enhance ranging security.

According to an embodiment, in addition to the method of using a plurality of STS segments to obtain a plurality of ranging values, a method of performing a plurality of consecutive ranging processes may also be used. The electronic device according to an embodiment may perform integrity checking as in operation S1670 of FIG. 16A, based on a plurality of ranging values obtained through a plurality of consecutive ranging processes. An interval between the consecutive ranging processes may be set to be equal to or shorter than a coherence time, and thus channel switching due to motion of the electronic device may be prevented.

Figure 16B:
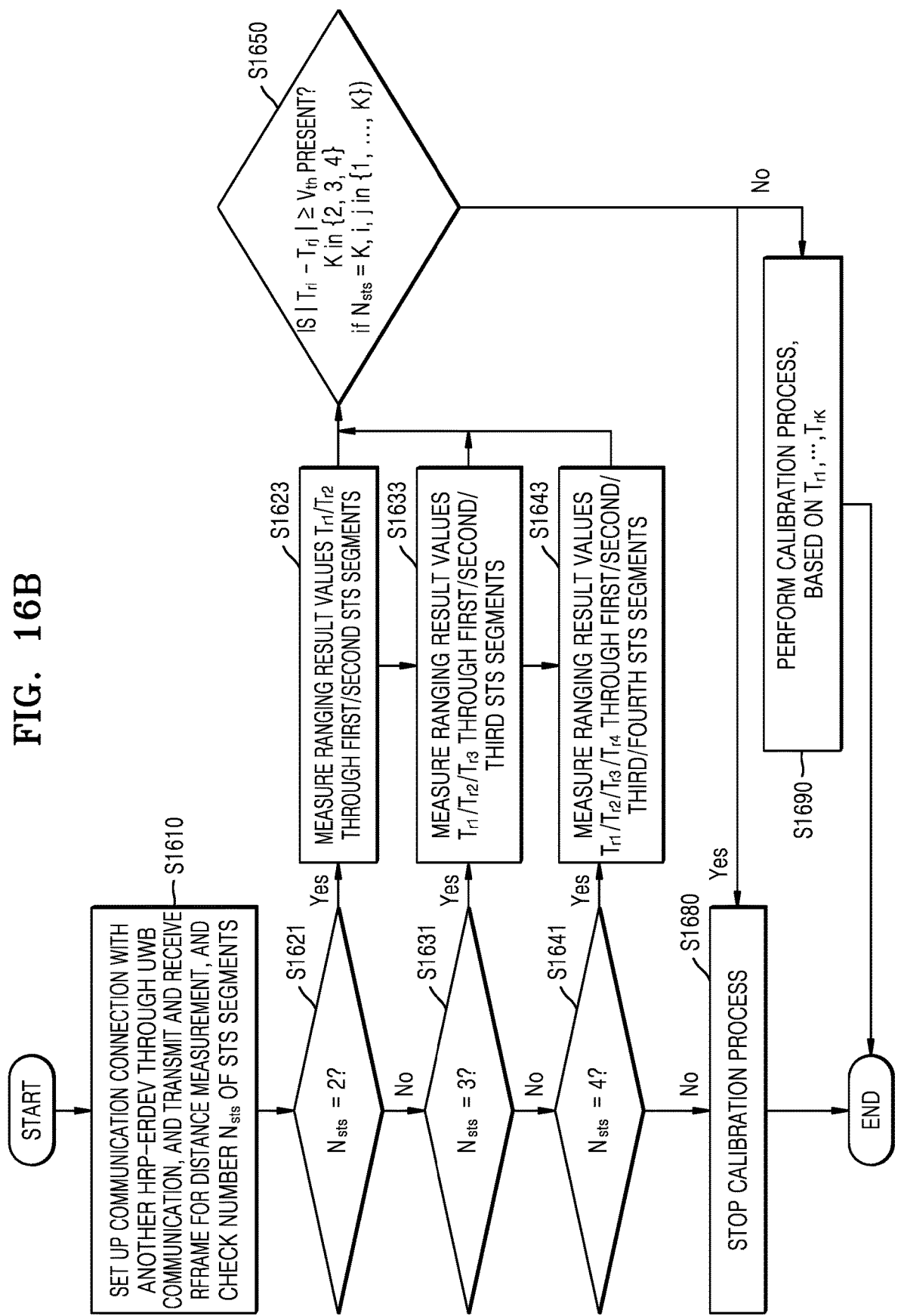
FIG. 16B is a flowchart of a method by which an electronic device performs ranging calibration by using a plurality of STS segments, according to an embodiment.

The electronic device according to an embodiment may perform ranging calibration by using STS segments. Referring to FIG. 16B, the electronic device may perform ranging to obtain a ranging result value $T_{ri}$ (i in {1, ..., K}, $N_{sts}=K$, and K in {2, 3, 4}) per STS segment. The electronic device may increase ranging accuracy of an HRP-ERDEV by performing ranging calibration, based on K ranging values.

Operations S1610, S1621, S1623, S1631, S1633, S1641, S1643, and S1650 of FIG. 16B respectively correspond to operations S1610, S1621, S1623, S1631, S1633, S1641, S1643, and S1650 of FIG. 16A and thus a repeated description thereof may not be provided herein.

In operation S1650, the electronic device according to an embodiment may determine whether a difference between the measured ranging result values is equal to or greater than a threshold value.

When (or based on) the difference between the measured ranging result values is equal to or greater than the threshold value, in operation S1680, the electronic device may determine that the ranging result values are affected by interference, and stop the ranging calibration process. When (or based on) the difference between the measured ranging result values is not equal to or greater than the threshold value, in operation S1690, the electronic device may determine that the ranging result values are not greatly affected by interference, and perform the ranging calibration process.

To perform the ranging calibration process, in operation S1690, the electronic device may measure ranging result values $T_{r1}, ..., T_{rK}$ (K in {2, 3, 4}) and then determine, through k-means clustering or the like, whether any of the measured ranging result values exhibits a great difference from the other values. When any of the measured ranging result values exhibits a great difference from the other values, the electronic device may determine that the ranging result value is greatly affected by interference, and exclude the ranging result value from the calibration process.

Figure 16C:
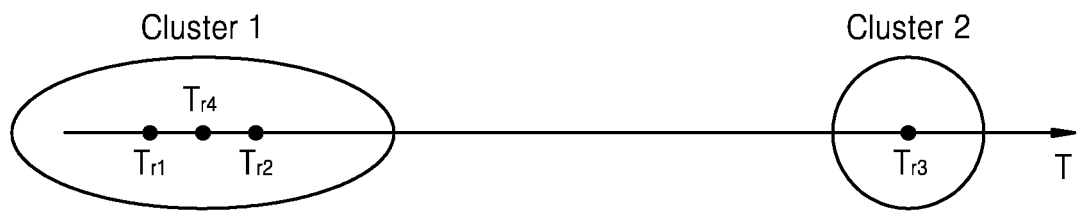
FIG. 16C is a diagram for describing clustering for ranging calibration.

For example, as illustrated in FIG. 16C, when $N_{STS}=4$ and $T_{r3}$ from among the ranging result values exhibits a great difference from the other values $T_{r1}$, $T_{r2}$, and $T_{r4}$, the electronic device may determine that $T_{r3}$ is a value greatly affected by interference. Therefore, $T_{r3}$ may be excluded from the ranging calibration process.

The electronic device may use $T_{result}$ as a final ranging result value by performing ranging calibration according to [Equation 5] below by using M ranging values not excluded from among the K ranging values.

In [Equation 5], as (i in $\{1, \ldots, M\}$) is a parameter closely related to a ranging channel and noise, and is determined as a value optimized based on a desired utility function in implementing the electronic device.

[Equation 5]

$$T_{result} = \sum_{i=1}^{M} a_i \times T_{ri} + \left(1 - \sum_{i=1}^{M} a_i\right) \times T_{ri}, \text{ for } 0 \le a_i \le 1, N_{sts}$$
$$= K, K \text{ in } \{2, 3, 4\}, M \text{ in } \{1, \ldots, K\}$$

Both preamble-based ranging and STS-based ranging may be applied to the ranging method according to the embodiment illustrated in FIG. 16B. The embodiment illustrated in FIG. 16B may be used together with the embodiment illustrated in FIG. 10B or FIG. 14. That is, to calculate two ranging values through two SS-TWR processes included in DS-TWR according to an embodiment, STS-based ranging may be performed, preamble-based ranging may be performed, or STS-based ranging and preamble-based ranging may be performed together.

According to an embodiment, the electronic device may flexibly use the ranging methods illustrated in FIGS. 9A, 10A, 12, and 16A. Further, according to an embodiment, the electronic device may flexibly use the ranging methods illustrated in FIGS. 9B, 10B, 14, and 16B.

According to an embodiment, the electronic device may variably use the number of frames used for DS-TWR and the number of STS segments used for ranging using STS segments.

When four, instead of three, frames are used to perform DS-TWR or two or more STS segments are used according to an embodiment, a ranging security level and ranging accuracy are increased, but time and energy efficiencies are reduced because more resources need to be used for one ranging process.

Therefore, ranging parameters including the number of frames used for DS-TWR, the number of STS segments, and a ranging cycle may be variably determined as necessary.

Figure 17:
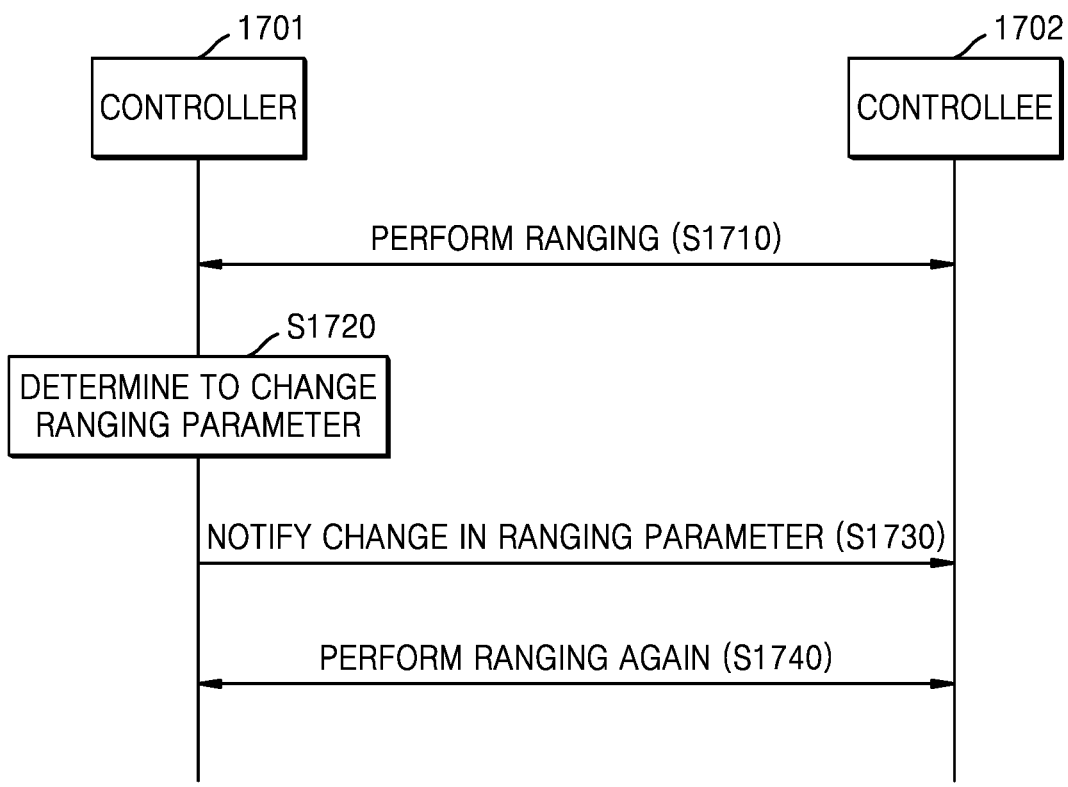
FIG. 17 is a diagram illustrating a process by which a plurality of electronic devices change a ranging parameter.

FIG. 17 is a diagram illustrating a process by which a plurality of electronic devices determine a ranging parameter. A controller device 1701 and a controllee device 1702 may perform ranging by communicating with each other.

Referring to FIG. 17, in operation S1710, the controller device 1701 and the controllee device 1702 according to an embodiment may perform ranging. The controller device 1701 and the controllee device 1702 may perform ranging, based on a pre-determined ranging parameter. The ranging parameter may include at least one of a ranging scheme, a ranging cycle, the number of frames used for ranging, or the number of STS segments included in a frame. For example, the controller device 1701 and the controllee device 1702 may perform ranging by using DS-TWR or STS segments.

In operation S1720, the controller device 1701 according to an embodiment may determine to change the ranging parameter.

For example, upon determining to increase a ranging security level or ranging accuracy, the controller device 1701 may increase the number of frames used for ranging or the number of STS segments included in a frame.

As an example, the controller device 1701 according to an embodiment may determine to change the number of frames for DS-TWR. The controller devices 1701 using DS-TWR for transmitting and receiving three frames may increase the number of frames for DS-TWR to increase the ranging security level and the ranging accuracy.

Although a ranging result value is obtained using two SS-TWR result values based on three frames, the controller device 1701 according to an embodiment may determine that reliability of the ranging result value is low or that a higher ranging security level and higher ranging accuracy are required. When a higher ranging security level and higher ranging accuracy are required, the controller device 1701 may increase the number of frames based on direct determination. Alternatively, the controller device 1701 may increase the number of frames by receiving a request from the controllee device 1702. The controllee device 1702 may request the controller device 1701 to increase the number of frames for DS-TWR.

As another example, the controller device 1701 according to an embodiment may determine to change the number of STS segments. Although N STS segments are used to increase the ranging security level and the ranging accuracy, the controller devices 1701 may determine that reliability of a ranging result value is low or that a higher ranging security level and higher ranging accuracy are required. When a higher ranging security level and higher ranging accuracy are required, the controller device 1701 may increase the number of STS segments based on direct determination. Alternatively, the controller device 1701 may increase the number of STS segments by receiving a request from the controllee device 1702. The controllee device 1702 may request the controller device 1701 to increase the number of STS segments.

In operation S1730, the controller device 1701 according to an embodiment may notify the controllee device 1702 of the change in the ranging parameter.

In operation S1740, the controller device 1701 and the controllee device 1702 may perform ranging again by using the changed ranging parameter.

Figure 18A:
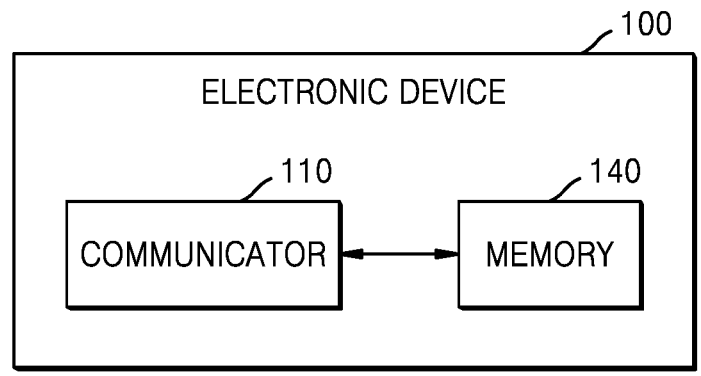
FIG. 18A is a block diagram of electronic devices according to various embodiments.
Figure 18B:
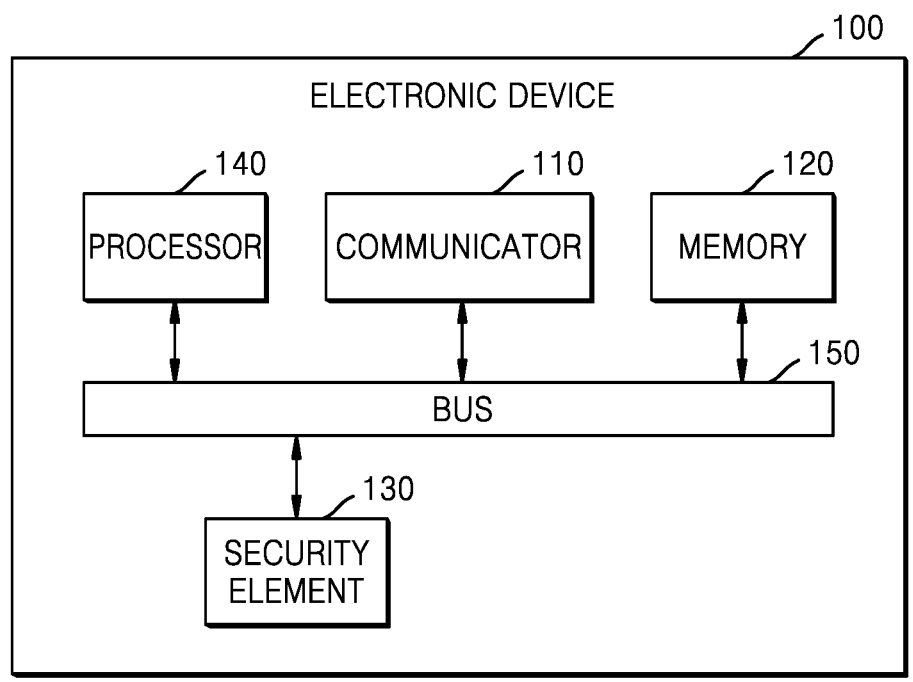
FIG. 18B is a block diagram of electronic devices according to various embodiments.

FIGS. 18A and 18B are block diagrams of electronic devices according to various embodiments. Each of the electronic devices illustrated in FIGS. 18A and 18B may be an electronic device serving as an initiator or a responder in the above-described various embodiments. Alternatively, each of the electronic devices illustrated in FIGS. 18A and 18B may be an electronic device serving as a receiver or a transmitter in the above-described various embodiments. Alternatively, each of the electronic devices illustrated in FIGS. 18A and 18B may be an electronic device serving as a controller or a controllee in the above-described various embodiments.

Referring to FIG. 18A, according to various embodiments, an electronic device 100 for performing UWB ranging may include a communicator 110 (e.g., at least one communicator) and a processor 140 (e.g., at least one processor). However, the electronic device 100 may include a larger number of elements compared to the elements illustrated in FIG. 18A.

At least some of operations and functions of the processor 140 described below may be performed by a plurality of processors. The electronic device 100 illustrated in FIG. 18A may perform the UWB ranging methods according to various embodiments, and the descriptions provided in relation to FIGS. 9A, 9B, 10A, 10B, 11, 12, 13A to 13C, 14, 15, 16A to 16C, and 17 may be applied thereto. Therefore, a repeated description thereof may not be provided herein.

The communicator 110 according to an embodiment may communicate with another device or a network in a wired or wireless manner. To this end, the communicator 110 may include a communication module supporting at least one of various wired/wireless communication methods. For example, the communication module may be a chipset, or a sticker/barcode including information required for communication (e.g., a sticker including a near-field communication (NFC) tag).

Wireless communication may include at least one of, for example, cellular communication, Wireless Fidelity (Wi-Fi), Wi-Fi direct, Bluetooth, UWB, or NFC. Wired communication may include at least one of, for example, universal serial bus (USB) or high-definition multimedia interface (HDMI).

In an embodiment, the communicator 110 may include a communication module for short-range communication. For example, in addition to UWB, Wi-Fi, Wi-Fi Direct, Bluetooth, and NFC mentioned above, the communicator 110 may include communication modules for various types of short-range communication, e.g., infrared communication, magnetic secure transmission (MST), and magnetic secure communication.

The processor 140 controls overall operations of the electronic device 100 and may include at least one processor such as a central processing unit (CPU) or a graphic processing unit (GPU). The processor 140 may control other elements included in the electronic device 100, to perform UWB ranging.

The communicator 110 may transmit and receive at least one frame for ranging, to and from at least one other electronic device. The processor 140 may obtain a first ranging value and a second ranging value, based on the at least one frame, and perform integrity checking or ranging calibration, based on a result of comparing the first and second ranging values.

A method by which the processor 140 obtains ranging values is described above in relation to FIGS. 6 and 7 and a repeated description thereof may not be provided herein. A method by which the processor 140 performs integrity checking or ranging calibration, based on the result of comparing the ranging values, is described above in relation to FIGS. 9A, 9B, 10A, 10B, 11, 12, 13A to 13C, 14, 15, and 16A to 16C and thus a repeated description thereof may not be provided herein.

For integrity checking to perform secure UWB ranging, the processor 140 may calculate the first ranging value, based on timings determined using an STS included in the at least one frame, and calculate the second ranging value, based on timing information included in a preamble included in the at least one frame.

As an example, when the electronic device 100 is an initiator device for performing SS-TWR, the communicator 110 may transmit a first frame, and receive a second frame in response to the first frame. The processor 140 may obtain the first ranging value and the second ranging value. The processor 140 may calculate the first ranging value, based on timings determined using an STS included in the first frame and the second frame. The processor 140 may determine a timing for calculating the first ranging value on the basis of a peak value of cross correlation of a pre-calculated STS and an STS included in the second frame. The processor 140 may calculate the second ranging value, based on timing information included in a preamble included in the first frame and the second frame.

As another example, when the electronic device 100 is a responder device for performing DS-TWR, the communicator 110 may receive a first frame, transmit a second frame in response to the first frame, and receive a third frame in response to the second frame. The processor 140 may calculate the first ranging value, based on timings determined using an STS included in the first frame, the second frame, and the third frame, and calculate the second ranging value, based on timing information included in a preamble included in the first frame, the second frame, and the third frame.

Meanwhile, for integrity checking to perform secure UWB ranging, the electronic device 100 according to another embodiment may perform two SS-TWR processes in two round-trip measurement processes included in DS-TWR.

As an example, when the electronic device 100 is an initiator device for performing DS-TWR, the communicator 110 may transmit a first frame, receive a second frame in response to the first frame, and transmit a third frame in response to the second frame. The processor 140 may calculate the first ranging value, based on timings determined based on the first frame and the second frame, and receive, from a responder device, the second ranging value calculated based on timings determined based on the second frame and the third frame. The processor 140 may perform integrity checking on the ranging operation by comparing the first ranging value calculated through a first round-trip measurement process, to the second ranging value calculated through a second round-trip measurement process.

As another example, when the electronic device 100 is a responder device for performing DS-TWR, the communicator 110 may receive a first frame, transmit a second frame in response to the first frame, and receive a third frame in response to the second frame. The processor 140 may receive, from an initiator device, the first ranging value calculated based on timings determined based on the first frame and the second frame, and calculate the second ranging value, based on timings determined based on the second frame and the third frame. The processor 140 may perform integrity checking on the ranging operation by comparing the first ranging value calculated through a first round-trip measurement process, to the second ranging value calculated through a second round-trip measurement process.

Meanwhile, for integrity checking to perform secure UWB ranging, the electronic device 100 according to still another embodiment may compare a plurality of ranging values calculated using a plurality of STS segments.

The processor 140 according to an embodiment may calculate the first ranging value, based on timings determined using a first STS segment included in the at least one frame, and calculate the second ranging value, based on timing information included in a second STS segment included in the at least one frame.

The processor 140 according to an embodiment may perform integrity checking, based on a result of comparing the first ranging value and the second ranging value. When a difference between the first ranging value and the second ranging value is included in a threshold range, the processor 140 may determine that ranging is properly performed by a device to which an access right is granted. When the difference between the first ranging value and the second ranging value is less than a threshold value, the processor 140 may continue the authorization process to grant an access right to the other electronic device.

The processor 140 according to an embodiment may obtain a third ranging value, based on the first ranging value and the second ranging value, and grant an access right, based on the third ranging value. When the difference between the first ranging value and the second ranging value is less than the threshold value, the processor 140 may obtain the third ranging value, based on the first ranging value and the second ranging value, and grant an access right, based on the third ranging value.

The third ranging value may be a weighted sum of the first ranging value and the second ranging value. For example, when the difference between the first ranging value and the second ranging value is included in the threshold range, the processor 140 may determine that ranging is properly performed by a device to which an access right is granted.

To increase ranging accuracy, the processor 140 may perform ranging calibration to obtain the third ranging value, based on the first ranging value and the second ranging value. The third ranging value may be calculated according to, for example, [Equation 3] to [Equation 5] above. A repeated description thereof may not be provided herein. The processor 140 may grant an access right to the other electronic device, based on the third ranging value.

Otherwise, when the difference between the first ranging value and the second ranging value is not included in the threshold range, the processor 140 may determine that an attack is made by a device to which an access right is not granted. When the difference between the first ranging value and the second ranging value is equal to or greater than the threshold value, the processor 140 may stop the authorization process. When the difference between the first ranging value and the second ranging value is equal to or greater than the threshold value, the processor 140 may stop the ranging calibration process.

The processor 140 according to an embodiment may determine to change a ranging parameter, based on the result of integrity checking. The ranging parameter may include at least one of a ranging scheme, a ranging cycle, the number of frames used for ranging, or the number of STS segments included in a frame.

For example, upon determining to increase a ranging security level or ranging accuracy, the processor 140 according to an embodiment may increase the number of frames used for ranging or the number of STS segments included in a frame. The communicator 110 may notify the other electronic device of the change in the ranging parameter.

Meanwhile, as illustrated in FIG. 18B, the electronic device 100 according to various embodiments may further include a memory 120, a security element 130, and a bus 150 for connecting the other elements.

To perform UWB ranging according to various embodiments, the processor 140 may execute programs stored in the memory 120, read files stored in the memory 120, or store new files in the memory 120 and the security element 130. Instructions stored in the memory 120 may be executed by the processor 140 to implement embodiments.

Programs (e.g., applications) and various types of data (e.g., files) may be installed and stored in the memory 120. The processor 140 may access and use the data stored in the memory 120, or store new data in the memory 120. In an embodiment, programs and data for securely and accurately performing ranging may be installed and stored in the memory 120.

The security element 130 is an independent secure storage device of the electronic device 100 and is a secure area accessible by only authorized applications. The security element 130 may be configured to be physically isolated from the other hardware elements. According to an embodiment, the security element 130 may include, for example, an embedded secure element (eSE), a universal integrated circuit card (UICC), a secure digital (SD) card, or an embedded UICC (eUICC), but is not limited thereto.

The security element 130 may include a memory and a processor, and the processor of the security element 130 may control overall operations of the security element 130. The processor of the security element 130 may control the elements included in the security element 130, to securely perform UWB ranging. For example, the processor of the security element 130 may execute programs stored in the memory of the security element 130, read data stored in the memory of the security element 130, or store new data in the memory of the security element 130. Instructions or programs stored in the memory of the security element 130 may be executed by the processor of the security element 130 to implement embodiments. According to an embodiment, programs and data for securely controlling access to a device through integrity checking on a ranging operation may also be installed and stored in the security element 130.

The bus 150 is a shared data path for connecting the communicator 110, the memory 120, the security element 130, and the processor 140.

The electronic device 100 according to various embodiments may increase ranging security of ERDEVs using an HRP UWB PHY, by performing integrity checking on ranging values. The electronic device 100 may increase a ranging security level by detecting an attack using an early path insertion strategy, e.g., a relay attack or a mafia attack. Consequently, according to various embodiments, a security level of a UWB based on UWB ranging may also be increased.

In addition, the electronic device 100 according to various embodiments may increase ranging accuracy by performing ranging calibration on ranging values. The afore-described various embodiments may be used to increase ranging accuracy of ERDEVs considering an HRP UWB PHY.

Embodiments may be implemented as a software program including instructions stored in a computer-readable storage medium.

The computer is a device capable of fetching instructions stored in a storage medium, and operating according to embodiments of the disclosure based on the fetched instructions, and may include an electronic device according to the embodiments.

The computer-readable storage medium may be provided in the form of a non-transitory storage medium. When the storage medium is "non-transitory," it means that the storage medium does not include signals and is tangible, and does not limit data to being semi-permanently or temporarily stored in the storage medium.

An electronic device or a method according to embodiments may be included and provided in a computer program product. The computer program product may be traded between sellers and buyers.

The computer program product may include a software program, and a computer-readable storage medium having the software program stored therein. For example, the computer program product may include a product that is electronically distributed in the form of a software program (e.g., a downloadable application) via a manufacturer of the electronic device or an electronic market. For electronic distribution, at least a part of the software program may be stored in the storage medium or be temporarily generated. In this case, the storage medium may be a server of the manufacturer, a server of the electronic market, or a storage medium of a relay server that temporarily stores the software program.

In a system including a server and a terminal (e.g., a backend server and a device), the computer program product may include a storage medium of the server or the terminal. Otherwise, when a third device (e.g., a smartphone) connected to the server or the terminal is present, the computer program product may include a storage medium of the third device. Alternatively, the computer program product may include a software program itself that is transmitted from the server to the terminal or the third device, or from the third device to the terminal.

In this case, one of the server, the terminal, and the third device may execute the computer program product to perform the method according to embodiments. Alternatively, two or more of the server, the terminal, and the third device may execute the computer program product to perform the method according to embodiments in a distributed fashion.

For example, the server (e.g., a cloud server or an artificial intelligence (AI) server) may execute the computer program product stored in the server to control the terminal connected to the server to perform the method according to embodiments.

As another example, the third device may execute the computer program product to control the terminal connected to the third device to perform the method according to embodiments. Specifically, for example, the third device may remotely control the electronic device to perform the method according to embodiments.

When the third device executes the computer program product, the third device may download the computer program product from the server and execute the downloaded computer program product. Alternatively, the third device may execute the computer program product provided in a preloaded state to perform the method according to embodiments.

By performing integrity checking on ranging values according to various embodiments, a security level of ranging may be increased and thus a security level of UWB services may also be increased. In addition, by performing calibration on ranging values by ranging values according to various embodiments, accuracy of ranging may be increased.

What is claimed is:

1. A method of operating an electronic device for performing ranging by using an ultra-wideband (UWB) in a wireless communication system, the method comprising:
   receiving a ranging frame (RFRAME) from a second electronic device, the RFRAME including a scrambled timestamp sequence (STS) and a preamble;
   obtaining a first ranging result using the STS and a second ranging result using the preamble; and
   performing integrity checking, based on a result of comparing the first ranging result with the second ranging result.

2. The method of claim 1, wherein:
   the obtaining the first ranging result and the second ranging result comprises:
      calculating the first ranging result, based on timings determined using the STS, and
      calculating the second ranging result, based on timing determined using the preamble.

3. The method of claim 1,
   further comprises:
      receiving an other RFRAME from the second electronic device,
      calculating a third ranging result, based on timings determined using the STS comprised in the RFRAME and the other RFRAME; and
      calculating a fourth ranging result, based on timing determined using the preamble comprised in the RFRAME and the other RFRAME.

4. The method of claim 1, wherein the performing the integrity checking comprises:
   determining that an attack is made, based on a difference between the first ranging result and the second ranging result being greater than or equal to a threshold value; and
   determining that the integrity checking is passed, based on the difference between the first ranging result and the second ranging result being less than the threshold value.

5. The method of claim 4, wherein the determining that the integrity checking is passed comprises:
   obtaining a third ranging result, based on the first ranging result and the second ranging result; and
   granting an access right, based on the third ranging result.

6. The method of claim 1, further comprising:
   determining to change a ranging parameter, based on a result of the integrity checking; and
   notifying the other electronic device of the change in the ranging parameter.

7. The method of claim 6, wherein the ranging parameter comprises at least one of a ranging scheme, a ranging cycle, a number of frames used for ranging, and a number of STS segments comprised in a frame.

8. The method of claim 1, wherein:
   a timing for calculating the first ranging result is determined based on a peak value of cross correlation of a pre-calculated STS and the STS comprised in the RFRAME.

9. An electronic device for performing ranging by using an ultra-wideband (UWB) in a wireless communication system, the electronic device comprising:
   a communicator configured to receive a ranging frame (RFRAME) from a second electronic device, the RFRAME including a scrambled timestamp sequence (STS) and a preamble; and
   at least one processor configured to:
      obtain a first ranging result using the STS and a second ranging result using the preamble, and
      perform integrity checking, based on a result of comparing the first ranging result with the second ranging result.

10. The electronic device of claim 9, wherein:
    the at least one processor is further configured to:
       calculate the first ranging result, based on timing determined using the STS comprised in the RFRAME, and
       calculate the second ranging result based on timing determined using the preamble comprised in the RFRAME.

* * * * *